US009638315B2

(12) United States Patent
Kelly et al.

(10) Patent No.: US 9,638,315 B2
(45) Date of Patent: May 2, 2017

(54) TRANSMISSION SYSTEM

(71) Applicant: Drive System Design, Warwickshire (GB)

(72) Inventors: David Kelly, Warwichshire (GB);
Pedro Zabala, Warwichshire (GB);
Andrew Harrison, Warwichshire (GB);
Mark Findlay, Warwichshire (GB);
Alex Tylee-Birdsall, Warwichshire (GB)

( * ) Notice: Subject to any disclaimer, the term of this patent is extended or adjusted under 35 U.S.C. 154(b) by 113 days.

(21) Appl. No.: 14/409,564

(22) PCT Filed: Jun. 21, 2013

(86) PCT No.: PCT/EP2013/063069
§ 371 (c)(1),
(2) Date: Dec. 19, 2014

(87) PCT Pub. No.: WO2013/190126
PCT Pub. Date: Dec. 27, 2013

(65) Prior Publication Data
US 2015/0176702 A1    Jun. 25, 2015

(30) Foreign Application Priority Data

Jun. 22, 2012 (GB) .................................... 1211160.5
Apr. 17, 2013 (GB) .................................... 1306985.1

(51) Int. Cl.
*F16H 59/04* (2006.01)
*F16H 61/04* (2006.01)
(Continued)

(52) U.S. Cl.
CPC ......... *F16H 61/0403* (2013.01); *F16D 11/10* (2013.01); *F16D 23/04* (2013.01);
(Continued)

(58) Field of Classification Search
CPC .. F16H 3/006; F16H 2003/0931; F16H 3/091; F16H 47/02
(Continued)

(56) References Cited

U.S. PATENT DOCUMENTS 5,651,435 A * 7/1997 Perosky .................. F16D 23/06
192/219
5,666,806 A * 9/1997 Dietz ..................... F15B 21/087
60/327
(Continued)

FOREIGN PATENT DOCUMENTS

CN        1076411        9/1993
DE       19948392        5/2000
(Continued)

OTHER PUBLICATIONS

International Search Report and Written Opinion, PCT/EP2013/063069 (2013).
(Continued)

*Primary Examiner* — Ha D Ho
(74) *Attorney, Agent, or Firm* — Walters & Wasylyna LLC

(57) ABSTRACT

A transmission system (8) comprising at least one floating gear (14a, 16a, 18a) rotationally mounted upon a first shaft the system comprising a floating gear activation system for controlling torque transfer between the at least one floating gear (14a, 16a, 18a) and the first shaft (10), the gear activation system comprising a first device (28, 30) having a friction interface (28) for frictional engagement with a friction interface (30) disposed on a first side of the at least one floating gear (18a), and a second device (25, 26) having a locking interface (25) for an interpositional engagement with a locking interface (26) disposed on a second side, opposing the first side, of the at least one floating gear (18a), whereby the floating gear (18a) is rotationally coupleable to (Continued)

the first shaft (10) by the friction interface (28/30) and/or the locking interface (25/26).

52 Claims, 14 Drawing Sheets

(51) Int. Cl.
*F16D 11/10* (2006.01)
*F16D 23/04* (2006.01)
*F16H 3/089* (2006.01)
*F16D 11/14* (2006.01)
*F16D 13/26* (2006.01)
*F16D 21/04* (2006.01)
*F16D 23/06* (2006.01)
*F16H 63/30* (2006.01)

(52) U.S. Cl.
CPC .............. *F16H 3/089* (2013.01); *F16H 63/30* (2013.01); *F16H 63/3023* (2013.01); *F16D 11/14* (2013.01); *F16D 13/26* (2013.01); *F16D 21/04* (2013.01); *F16D 2023/0693* (2013.01); *F16H 2061/0407* (2013.01); *F16H 2061/0474* (2013.01); *F16H 2063/3093* (2013.01); *Y10T 74/19274* (2015.01); *Y10T 74/19284* (2015.01)

(58) Field of Classification Search
USPC .......................................................... 74/335
See application file for complete search history.

(56) References Cited

U.S. PATENT DOCUMENTS

| | | | |
|---|---|---|---|
| 5,887,688 A | 3/1999 | Ploetz et al. | |
| 5,975,263 A * | 11/1999 | Forsyth | F16D 23/06 192/53.32 |
| 6,176,146 B1 | 1/2001 | Ore | |
| 6,354,165 B1 | 3/2002 | Schnitzer et al. | |
| 6,988,363 B2 * | 1/2006 | Bitter | B66F 9/065 60/468 |
| 2013/0228027 A1 | 9/2013 | Ikeya et al. | |

FOREIGN PATENT DOCUMENTS

| | | |
|---|---|---|
| DE | 10224064 | 12/2003 |
| EP | 2055974 | 5/2009 |
| EP | 2 088 343 A2 | 8/2009 |
| EP | 2088343 | 8/2009 |
| EP | 2 088 343 A2 | 12/2009 |
| GB | 900436 | 7/1962 |
| JP | H04-116023 | 4/1992 |
| JP | H06-316231 | 11/1994 |
| JP | H09-273571 | 10/1997 |
| JP | 2009-185981 A | 8/2009 |
| JP | 2009-536713 A | 10/2009 |
| JP | 2010-510464 A | 4/2010 |
| WO | 2007/132209 A2 | 11/2007 |
| WO | 2008/062192 A1 | 5/2008 |
| WO | 2012/066740 A1 | 5/2012 |

OTHER PUBLICATIONS

Japanese Patent Office, Notice of Reasons for Rejection, Application No. 2015-517798, (Dec. 14, 2016).
English translation of: Japanese Patent Office, Notice of Reasons for Rejection, Application No. 2015-517798, (Dec. 14, 2016).
Japanese Patent Office, Official Action, JP 2015-517798 (2016).
State (Chinese) Intellectual Property Office, Official Action, CN 201380043325.1 (2016).

* cited by examiner

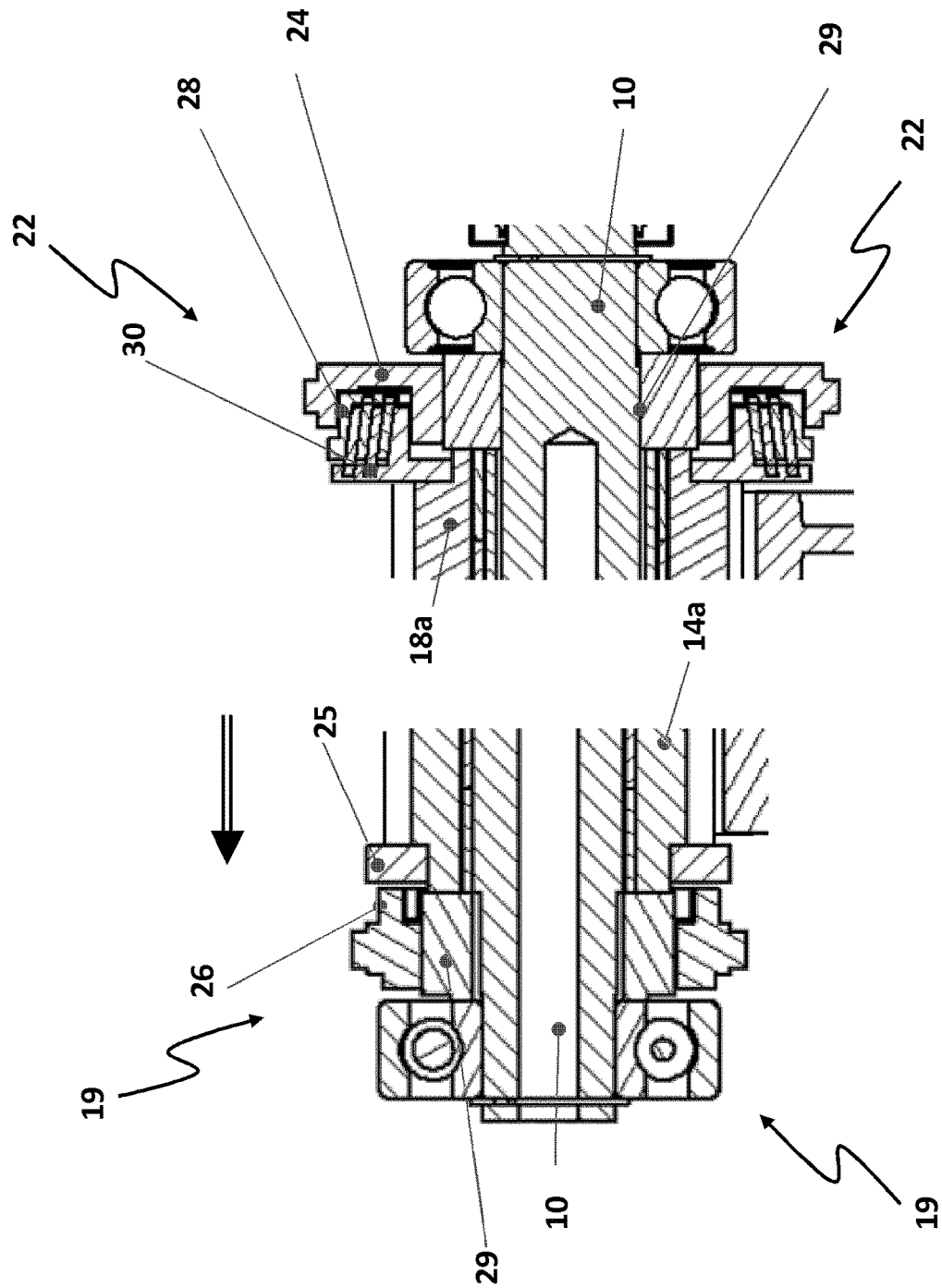

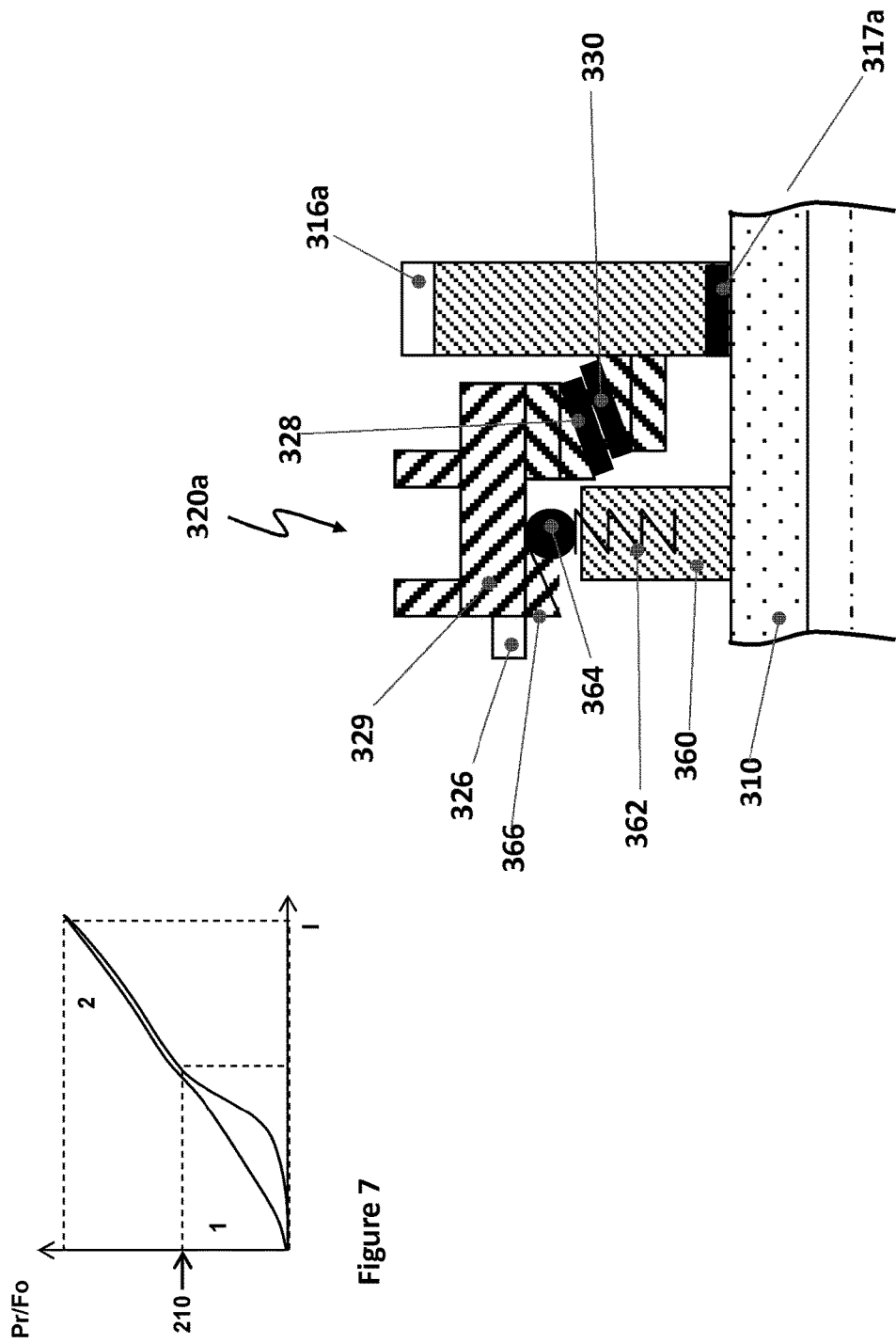

TRANSMISSION SYSTEM

This application is a U.S. national phase application of Intl. App. No. PCT/EP2013/063069 filed on Jun. 21, 2013, which claims priority from GB1211160.5 filed on Jun. 22, 2012, and from GB1306985.1 filed on Apr. 17, 2013. The entire contents of GB1211160.5 and GB1306985.1 are incorporated herein by reference.

TECHNICAL FIELD

The present invention relates to a transmission system or gearbox, an activator for gear selection and a method of gear selection; particularly but not exclusively to a transmission system or gearbox having an activator configured for frictional engagement with a gear and for locking engagement with a different gear and methods of powershifting between gear ratios.

BACKGROUND

It is known to provide vehicles with a transmission, also known as a gearbox, for providing speed and torque conversions between a rotating power source, engine or motor. For example between a crankshaft of an internal combustion engine and a driveshaft coupled to one or more differentials which drive the road wheels.

A typical manual transmission comprises an input shaft and an output shaft. The input shaft is coupled to the crankshaft of an engine via a clutch and flywheel.

The output shaft is coupled to the drive wheels via a drive shaft and one or more differentials or additional gears.

The input shaft comprises a plurality of gears, normally helical gears, which are fixed to the input shaft. The output shaft comprises a plurality of gears, one for each of the gears on the input shaft, the gears on the output shaft are "floating" that is to say they are mounted on bearings so as to rotate freely about the output shaft.

The output shaft also comprises a plurality of activators fixedly mounted thereon, which rotate with the output shaft. The activators comprise a locking mechanism for locking with a floating gear, typically a dog clutch.

It is known to combine a cone clutch with a dog clutch to create a synchroniser; the cone clutch engages first, in a frictional engagement with the selected gear to match the speed of the floating gear with the output shaft; once the speed is matched the activator is moved into locking engagement with the gear by engaging the dog clutch.

The activator may comprise a cone clutch and dog clutch on both sides for engagement with different gears.

The process of selecting or activating an individual gear comprises an initial friction stage that helps to synchronise gear and shaft speed. In this stage a sleeve provided on the activator pushes against a ring that blocks its way and this applies force to the friction interface.

When the speed is synchronous the blocking ring is pushed out of the way and the sleeve is free to continue its travel towards the gear. Once the blocking ring is moved, the synchroniser will not be able to generate any more friction unless the activator is returned to a neutral position and the process started again. If the initial speeds of the gear and shaft are synchronous, the friction phase will not be activated. After the friction phase is completed and the sleeve has travelled up to the locking interface of the gear, the locking phase takes place with the sleeve locking the gear to the shaft using the dog clutch. When returning the activator back to the neutral position the friction phase cannot be activated again and the only task performed is release of the gear, there is no control of torque or speed during the release stage.

The present invention seeks to overcome or at least mitigate the problems of the prior art.

SUMMARY

Whilst the present invention has particular application for vehicles, it is envisaged that the invention may be employed in other applications, for example it is foreseen that the invention may be employed in power generation, in pumping applications, marine applications and industrial applications.

A first aspect of the invention provides a method for shifting gear ratios of a transmission system comprising:

providing a first floating gear rotationally mounted upon a first shaft and a floating gear activation system for controlling torque transfer between the first floating gear and the first shaft, the gear activation system comprising a first device having a friction interface for frictional engagement with a friction interface disposed on a first side of the first floating gear, and a second device having a locking interface for interpositional engagement with a locking interface disposed on a second side of the first floating gear, the second side opposing the first side;

providing a second floating gear rotationally mounted upon the first shaft and the gear activation system comprising a third device having a friction interface for frictional engagement with a friction interface disposed on a first side of the second floating gear, and a fourth device having a locking interface for interpositional engagement with a locking interface disposed on a second side of the second floating gear, the second side opposing the first side;

engaging the friction interface of the first device with the friction interface of the first floating gear by sliding the first device along the first shaft;

disengaging the locking interface of the second device from the locking interface of the first floating gear by sliding the second device along the first shaft;

engaging the friction interface of the third device with the friction interface of the second floating gear by sliding the third device along the first shaft;

disengaging the friction interface of the first device with the friction interface of the first floating gear by sliding the first device along the first shaft;

engaging the locking interface of the fourth device with the locking interface of the second floating gear by sliding the fourth device along the first shaft.

disengaging the friction interface of the third device with the friction interface of the second floating gear by sliding the third device along the first shaft.

Advantageously, the method provides gear shifts adapted for minimum torque disturbance or variation.

Optionally, the method comprises:

receiving data from a sensor indicating the torque being transferred by the friction interfaces of the first floating gear is substantially zero.

Optionally, the method comprises:

receiving data from a sensor indicating the torque being transferred by the friction interfaces of the second floating gear is substantially equal to the torque delivered to the transmission system by an engine or motor.

Optionally, torque is transferred from the first floating gear to the second floating gear while the friction interface of the first device is engaged with the friction interface of the first floating gear and the friction interface of the third device is simultaneously engaged with the friction interface of the second floating gear, whereby effecting a powershift between the first floating gear and the second floating gear.

Optionally, the method comprises:

providing at least one further floating gear mounted upon the first shaft, the or each at least one further floating gear having a friction interface for frictional engagement with a respective friction interface of at least one further device, the method further comprising;

frictionally engaging one or more of the friction interfaces of the at least one further floating gears, and simultaneously, engaging the friction interface of the third device with the friction interface of the second floating gear by sliding the third device along the first shaft.

A second aspect of the invention provides A method for shifting gear ratios of a transmission system comprising:

providing a first floating gear rotationally mounted upon a first shaft and a floating gear activation system for controlling torque transfer between the first floating gear and the first shaft, the gear activation system comprising a first device having a friction interface for frictional engagement with a friction interface disposed on a first side of the first floating gear, and a second device having a locking interface for interpositional engagement with a locking interface disposed on a second side of the first floating gear, the second side opposing the first side;

providing a second floating gear rotationally mounted upon the first shaft and the gear activation system comprising a third device having a friction interface for frictional engagement with a friction interface disposed on a first side of the second floating gear, and a fourth device having a locking interface for interpositional engagement with a locking interface disposed on a second side of the second floating gear, the second side opposing the first side;

engaging the friction interface of the third device with the friction interface of the second floating gear by sliding the third device along the first shaft;

disengaging the locking interface of the second device from the locking interface of the first floating gear by sliding the second device along the first shaft;

engaging the locking interface of the fourth device with the locking interface of the second floating gear by sliding the fourth device along the first shaft.

disengaging the friction interface of the third device with the friction interface of the second floating gear by sliding the third device along the first shaft.

Advantageously, the method provides gear shifts adapted for maximum performance and minimum delay.

Optionally, the method comprises:

receiving data from a sensor indicating the torque being transferred by the friction interfaces of the first floating gear is substantially zero.

Optionally, the method comprises:

receiving data from a sensor indicating the torque being transferred by the friction interfaces of the second floating gear is substantially equal to the torque delivered to the transmission system by an engine or motor.

Optionally, torque is transferred from the first floating gear to the second floating gear while the friction interface of the first device is engaged with the friction interface of the first floating gear and the friction interface of the third device is simultaneously engaged with the friction interface of the second floating gear, whereby effecting a powershift between the first floating gear and the second floating gear.

Optionally, the method comprises:

providing at least one further floating gear mounted upon the first shaft, the or each at least one further floating gear having a friction interface for frictional engagement with a respective friction interface of at least one further device, the method further comprising;

frictionally engaging one or more of the friction interfaces of the at least one further floating gears, and simultaneously, engaging the friction interface of the third device with the friction interface of the second floating gear by sliding the third device along the first shaft.

A third aspect of the invention provides a transmission system comprising at least two floating gears rotationally mounted upon a first shaft, and at least two further gears mounted upon at least one further shaft said at least one further gear being coupled to a respective one of the at least two floating gear on the first shaft, the transmission system comprising a floating gear activation system for controlling torque transfer between each of the at least two floating gears and the first shaft, the gear activation system comprising a first device having a friction interface for frictional engagement with a friction interface disposed on a first side of each of the at least two floating gears, and a second device having a locking interface for an interpositional engagement with a locking interface disposed on a second side, opposing the first side, of each of the at least two floating gears, whereby the floating gear is rotationally coupleable to the first shaft by the friction interface and/or the locking interface, the transmission system comprising a control unit coupled to a sensor for measuring a parameter indicative of the torque on the first shaft the sensor positioned between the a first floating gear of the at least two floating gears and a second floating gear of the at least two floating gears, wherein the control unit receives data from the sensor indicating which of the first or second floating gears is transferring torque from the first shaft to the at least one further shaft.

Preferably, the first and second devices are slidingly mounted upon the first shaft in rotational engagement with the first shaft.

Preferably, the at least two further gears are fixedly mounted on the second shaft for rotational movement therewith.

Optionally, the at least two further gears are floating gear rotationally mounted upon the second shaft.

Optionally, the friction interface comprises a clutching mechanism.

Optionally, the clutch mechanism is a cone clutch, preferably a multi plate cone clutch.

Optionally, the locking interface comprises a dog clutch.

A fourth aspect of the invention provides A method for engaging a locking interface of a transmission system comprising:

providing a transmission system comprising first shaft having a first floating gear mounted thereon, and a first activator for synchronising rotation of the first floating gear with the first shaft, the first floating gear having a first locking interface for interpositional engagement with a second locking interface provided upon the first activator, the first and second locking interfaces forming a locking device, the activator being slidingly mounted upon the first shaft for movement in an axial direction a second activator for synchronising rotation of the first floating gear with the first shaft, the first floating gear having a first friction interface for frictional engagement with a second friction interface provided upon the second activator, the first and second locking interfaces forming a friction device, and the transmissions system comprising at least one sensor for providing data indicative of the axial position of the activator;

engaging the friction device to synchronise rotation of the first floating gear with the first shaft;

sliding the activator along the first shaft until the first interface contacts the second interface;

receiving data from the sensor;

determining whether the activator has moved to a position in which the first interface is in interpositional engagement with the second interface;

if the first locking interface is in interpositional engagement with the second locking interface;

disengaging the frictional device; or if the first interface is not in interpositional engagement with the second interface;

reducing the frictional engagement between the first and second friction interfaces; whereby rotating the first floating gear with respect to the first shaft such that the first locking interface rotates with respect to the second locking interface;

resliding the activator along the first shaft until the first locking interface is in interpositional engagement with the second locking interface.

Optionally, the step of reducing the frictional engagement between the first and second friction interfaces is followed by the step of:

increasing the frictional engagement between the first and second friction interfaces so as to synchronise the rotation of the first floating gear with the first shaft after the first floating gear has rotated with respect to the first shaft by predetermined angle.

Optionally, the step of resliding the activator along the first shaft until the first locking interface is in interpositional engagement with the second locking interface is carried out after the first floating gear has rotated with respect to the first shaft by predetermined angle.

Optionally, the step of resliding the activator along the first shaft until the first locking interface is in interpositional engagement with the second locking interface is carried out whilst the first floating gear is rotating with respect to the first shaft.

A fifth aspect of the invention provides a transmission system comprising at least one floating gear rotationally mounted upon a first shaft, the system comprising a floating gear activation system for controlling torque transfer between the at least one floating gear and the first shaft, the gear activation system comprising a first device having a friction interface for frictional engagement with a friction interface disposed on a first side of the at least one floating gear, and a second device having a locking interface for an interpositional engagement with a locking interface disposed on a second side, opposing the first side, of the at least one floating gear, whereby the floating gear is rotationally coupleable to the first shaft by the friction interface and/or the locking interface.

Preferably, the transmission system comprises at least one further gear mounted upon at least one further shaft said at least one further gear being coupled to a respective one of the at least one floating gear on the first shaft.

Optionally, the at least one further gear is fixedly mounted on the second shaft for rotational movement therewith.

Optionally, the at least one further gear is a floating gear rotationally mounted upon the second shaft.

Optionally, the friction interface comprises a clutching mechanism.

Optionally, the clutch mechanism is a cone clutch, preferably a multi plate cone clutch.

Optionally, the locking interface comprises a dog clutch.

Preferably, the first activator comprises a first and a second side, and the friction interface is provided on the first side and a locking interface is provided on the second side for engagement with a different floating gear provided on the first shaft.

Alternatively, the first activator comprises a first and second side and the friction interface is provided on a first side and a second friction interface is provided on the second side for engaging with a different floating gear provided on the first shaft.

Alternatively, the second activator comprises a first and second side and the locking interface is provided on a first side and a friction interface is provided on the second side for engaging with a different floating gear provided on the first shaft.

Alternatively, the second activator comprises a first and second side and the locking interface is provided on a first side and a second locking interface is provided on the second side for engaging with a different floating gear provided on the first shaft.

A sixth aspect of the invention provides a device for a transmission system comprising:

a first side;

a second side, opposing the first side;

a friction interface for frictional engagement with a friction interface of a first gear;

a locking interface for an interpositional engagement with a locking interface of a second gear;

wherein the friction interface is disposed on the first side and the locking interface is disposed on the second side.

A seventh aspect of the invention provides a transmission system comprising the device as described in the foregoing paragraphs.

An eighth aspect of the invention provides a vehicle comprising the transmission system as described in the foregoing paragraphs.

An ninth aspect of the invention provides a method for activating a floating gear of a transmission system comprising:

providing a first floating gear rotationally mounted upon a first shaft and a floating gear activation system for controlling torque transfer between the at least one floating gear and the first shaft, the gear activation system comprising a first device having a friction interface for frictional engagement with a friction interface disposed on a first side of the first floating gear, and a second device having a locking interface for an interpositional engagement with a locking interface disposed on a second side of the first floating gear, the second side opposing the first side;

sliding the first device along the first shaft, in a first direction, into frictional engagement with the friction interface on first side of the first gear, transferring torque to the first floating gear from the first shaft so as to substantially synchronise the first floating gear with the first shaft, and then sliding the second device along the first shaft, in a second direction opposing said first direction, into locking engagement with the locking interface on the second, opposing, side of the first gear, whereby locking the first floating gear with the first shaft.

Preferably, the method for activating a floating gear of a transmission system comprises sliding the first device along the first shaft, in the second direction, so as to disengage the friction interface of the first device from the friction interface on the first side of the first gear.

A tenth aspect of the invention provides a method for shifting gear ratios of a transmission system comprising:

providing a first floating gear rotationally mounted upon a first shaft and a floating gear activation system for controlling torque transfer between the first floating gear and the first shaft, the gear activation system comprising a first device having a friction interface for frictional engagement with a friction interface disposed on a first side of the first floating gear, and a second device having a locking interface for interpositional engagement with a locking interface disposed on a second side of the first floating gear, the second side opposing the first side;

providing a second floating gear rotationally mounted upon the first shaft and the gear activation system comprising a third device having a friction interface for frictional engagement with a friction interface disposed on a first side of the second floating gear, and a fourth device having a locking interface for interpositional engagement with a locking interface disposed on a second side of the second floating gear, the second side opposing the first side;

engaging the friction interface of the first device with the friction interface of the first floating gear by sliding the first device along the first shaft;

disengaging the locking interface of the second device from the locking interface of the first floating gear by sliding the second device along the first shaft;

engaging the friction interface of the third device with the friction interface of the second floating gear by sliding the third device along the first shaft;

disengaging the friction interface of the first device with the friction interface of the first floating gear by sliding the first device along the first shaft;

engaging the locking interface of the fourth device with the locking interface of the second floating gear by sliding the fourth device along the first shaft.

Preferably, torque is transferred from the first floating gear to the second floating gear while the friction interface of the first device is engaged with the friction interface of the first floating gear and the friction interface of the third device is simultaneously engaged with the friction interface of the second floating gear, whereby effecting a powershift between the first floating gear and the second floating gear.

Preferably, the method for shifting gear ratios comprises providing at least one further floating gear mounted upon the first shaft, the or each at least one further floating gear having a friction interface for frictional engagement with a respective friction interface of at least one further device, the method further comprising frictionally engaging one or more of the friction interfaces of the at least one further floating gears and simultaneously engaging the friction interface of the third device with the friction interface of the second floating gear by sliding the third device along the first shaft.

A eleventh aspect of the invention provides a method for holding a vehicle on a hill comprising:

providing a first floating gear rotationally mounted upon a first shaft and a floating gear activation system for controlling torque transfer between the first floating gear and the first shaft, the gear activation system comprising a first device having a friction interface for frictional engagement with a friction interface disposed on a first side of the first floating gear, and a second device having a locking interface for interpositional engagement with a locking interface disposed on a second side of the first floating gear, the second side opposing the first side;

providing at least one further floating gear mounted upon the first shaft, the or each at least one further floating gear having a friction interface for frictional engagement with a respective friction interface of at least one further device;

wherein the method comprises:

frictionally engaging the friction interface of the first floating gear with the first device and/or engaging the locking interface of the first floating with the second device;

and simultaneously engaging one or more of the friction interfaces of the at least one further floating gear with the respective friction interface of the at least one further device.

An twelfth aspect of the invention provides a method for shifting gear ratios of a transmission system comprising:

providing a first floating gear rotationally mounted upon a first shaft and a floating gear activation system for controlling torque transfer between the first floating gear and the first shaft, the gear activation system comprising a first device having a friction interface for frictional engagement with a friction interface disposed on a first side of the first floating gear, and a second device having a locking interface for interpositional engagement with a locking interface disposed on a second side of the first floating gear, the second side opposing the first side;

providing a second floating gear rotationally mounted upon a second shaft, the second floating gear being coupled to the first shaft by a further gear mounted on the first shaft and the gear activation system comprising a third device having a friction interface for frictional engagement with a friction interface disposed on a first side of the second floating gear, and a fourth device having a locking interface for interpositional engagement with a locking interface disposed on a second side of the second floating gear, the second side opposing the first side;

engaging the friction interface of the first device with the friction interface of the first floating gear by sliding the first device along the first shaft;

disengaging the locking interface of the second device from the locking interface of the first floating gear by sliding the second device along the first shaft;

engaging the friction interface of the third device with the friction interface of the second floating gear by sliding the third device along the second shaft;

disengaging the friction interface of the first device with the friction interface of the first floating gear by sliding the first device along the first shaft;

engaging the locking interface of the fourth device with the locking interface of the second floating gear by sliding the fourth device along the second shaft.

A thirteenth aspect of the invention provides a method for adapting the torque transfer function of a transmission system comprising:

engaging a friction interface of first activator with a friction interface of the gear under test, disengaging a locking interface of a second activator from a locking interface of the gear under test;

reducing the force applied by the friction interface of the first activator to the friction interface of the gear under test, whereby introducing a predefined degree of slip;

recording a control parameter of the transmission system which produces the predefined degree of slip;

receiving a parameter indicative of torque value delivered to the transmission system;

interrogating a database to obtain a stored value of the control parameter corresponding to the value of the parameter indicative of torque value delivered to the transmission system;

comparing the stored value of the control parameter with the recorded value of the control parameter;

updating the data base with the recorded value of the control parameter if different to the stored values;

increasing the pressure between the friction interface of the first activator and the friction interface of the gear under test so as to synchronise the gear under test with the shaft upon which it is mounted;

engaging a locking interface of the gear under test by activating the second activator to interpose the locking interface of the second activator with the locking interface of the gear under test;

disengaging the friction interface of the first activator from the friction interface of the gear under test.

Preferably, the method comprises:

detecting operation of the transmission system under stable conditions for a gear under test.

Preferably, the method comprises:

waiting until steady state conditions are reached with micro slip between the friction interfaces.

Preferably, the method replaces the step of, interrogating the database to obtain a stored value of the control parameter corresponding to the value of the parameter indicative of torque value delivered to the transmission system;

with the step of, calculating a value of the control parameter corresponding to the value of the parameter indicative of torque value delivered to the transmission system.

Preferably, the method omits the step of, comparing the stored value of the control parameter with the recorded value of the control parameter;

and the method, updates the database with the recorded value of the control parameter irrespective of whether or not the value is different to the stored value.

Preferably, the method reduces the force applied by the friction interface of the first activator to the friction interface of the gear under test, to introduce a predefined degree of micro-slip.

A fourteenth aspect of the invention provides a mechanism for moving an activator in a transmission system, which mechanism comprises a double acting cylinder having a double ended piston, the cylinder having a first port for fluid action on a first end of the piston and a second port for fluid action on a second end of the piston, the first port coupled to a first pressure control valve such that the mechanism can control the pressure or force applied when moving the piston in a first direction for engaging a friction interface of a transmission system, and the second port coupled to a direction control valve, such that the mechanism can control the direction of travel of the piston within the cylinder.

A fifteenth aspect of the invention provides a transmission system comprising a floating gear mounted upon a first shaft, the floating gear having a first side comprising a friction interface and a second side comprising a locking interface, wherein a first activator is disposed adjacent the first side of the floating gear and comprises a friction interface for frictional engagement with the floating gear, a second activator being disposed on the second side of the floating gear and having a locking interface for interposition with the locking interface of the floating gear wherein the floating gear can be rotationally coupled to the first shaft by the first activator and/or the second activator.

A sixteenth aspect of the invention provides a transmission system comprising a device slideably mounted upon a shaft, the device comprising first side comprising a friction interface for frictional engagement with a friction interface of a floating gear provided on the shaft wherein the device comprises a body mounted upon a support in rolling or sliding contact therewith for movement along the shaft, the device having a resilient device whose biasing force must be overcome when moving the body in a direction for engagement of the friction interface with the friction interface of the floating gear.

Preferably, the body comprises a ramp or recess which forms a detent for resisting movement of the body with respect to the support.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Embodiments of the invention will now be described, by way of example only, with reference to the accompanying drawings, in which:

FIG. 3 is an enlarged view of a second portion of FIG. 1;

FIG. 4 is an enlarged view of a third portion of FIG. 1;

FIG. 7 is a graph of pressure/force against current for a typical solenoid valve;

FIG. 8 is a schematic view in cross section of a device for overcoming hysteresis in a valve;

DETAILED DESCRIPTION OF EMBODIMENTS

Detailed descriptions of specific embodiments of the transmission system, vehicle, activator and method of actuation of a transmission of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the transmission system, vehicle, activator and method of actuation of a transmission described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
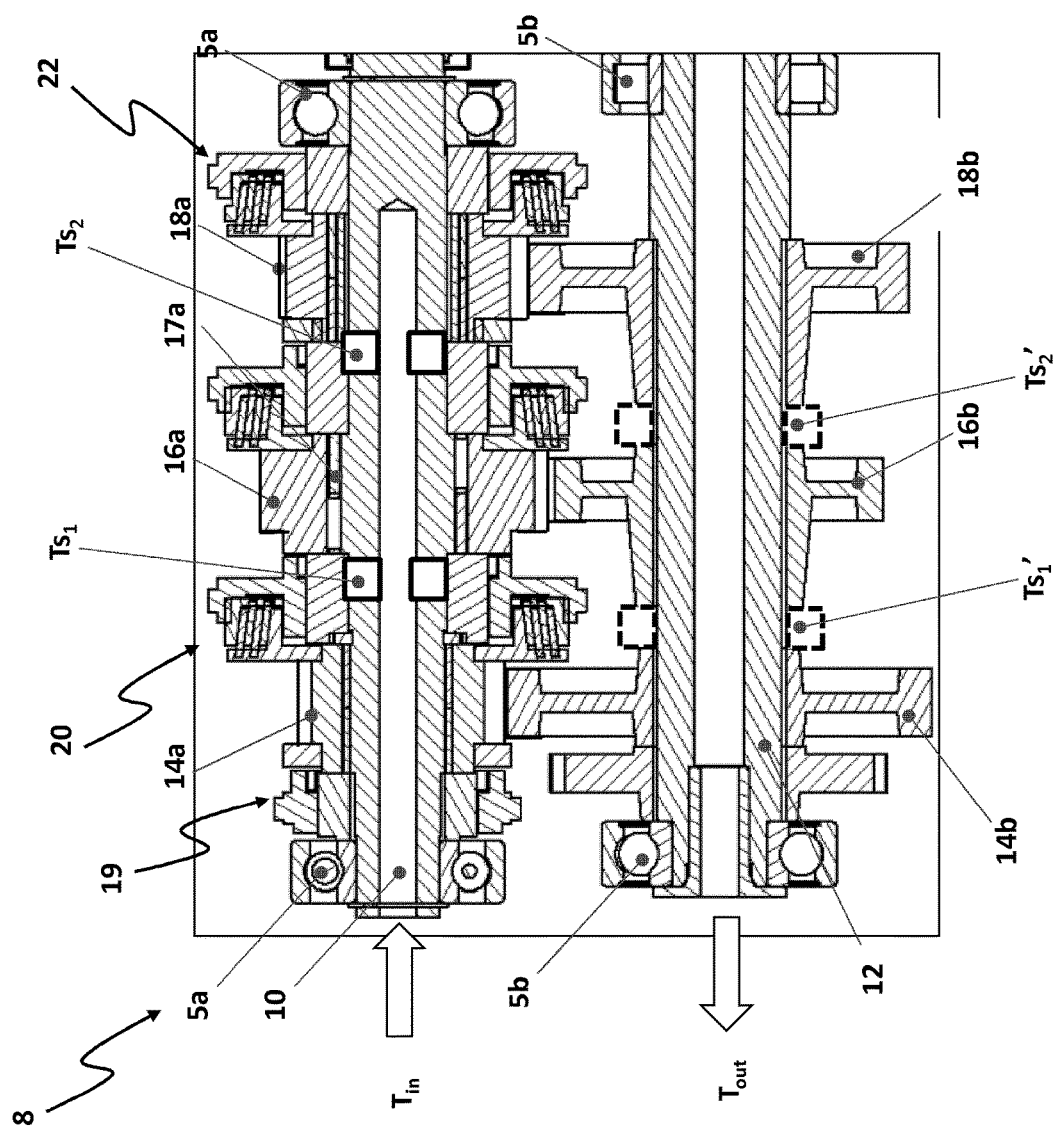
FIG. 1 schematically illustrates a cross-sectional view of a transmission system according to an embodiment of the present invention.

FIG. 1 illustrates a schematic representation of a transmission system 8 shown in cross section. The transmission system 8 comprises an input shaft 10 and an output shaft 12.

Input shaft 10 comprises a plurality of floating gears 14a, 16a, 18a. Floating gears 14a, 16a, 18a are rotationally mounted upon the input shaft 10 by bearings 17a. In this way rotation of the input shaft 10 does not rotate the floating gears 14a, 16a, 18a.

The output shaft 12 comprises a plurality of fixed gears 14b, 16b, 18b which synchronously rotate with the output shaft 12. Input and output shafts 10, 12 are rotationally mounted in a housing (not shown), the input and output shaft 10, 12 are mounted in the housing by bearings 5a, 5b respectively.

The floating gears 14a, 16a, 18a and fixed gears 14b, 16b, 18b each comprise a plurality of teeth. Preferably, the floating gears 14a, 16a, 18a and/or fixed gears 14b, 16b, 18b are helical gears, however in other embodiments other gear types are envisaged including but not limited to spur or straight cut gears or double helical gears.

The teeth of first floating gear 14a mesh or mate with the teeth of first fixed gear 14b. The teeth of second floating gear 16a mesh with the teeth of second fixed gear 16b and the teeth of third floating gear 18a mesh with the teeth of third fixed gear 18b.

The floating gears 14a, 16a, 18a are distributed along the input shaft 10 and the fixed gears 14b, 16b, 18b are distributed along the output shaft 12. The floating gears 14a, 16a, 18a are spaced apart from one another.

A double selector or activator 20 is provided between the first floating gear 14a and second floating gear 16a, a second double activator 20 is provided between the second floating gear 16a and third floating gear 18a.

A single selector or activator 19 is provided at a first end of the input shaft 10 adjacent to the first floating gear 14a.

A second single selector or activator 22 is provided at a second end of the input shaft 10 adjacent to the third floating gear 18a.

The double activators 20 and single activators 19, 22 are provided for coupling the floating gears 14a, 16a, 18a to the input shaft 10 so that they rotate synchronously.

Figure 2:
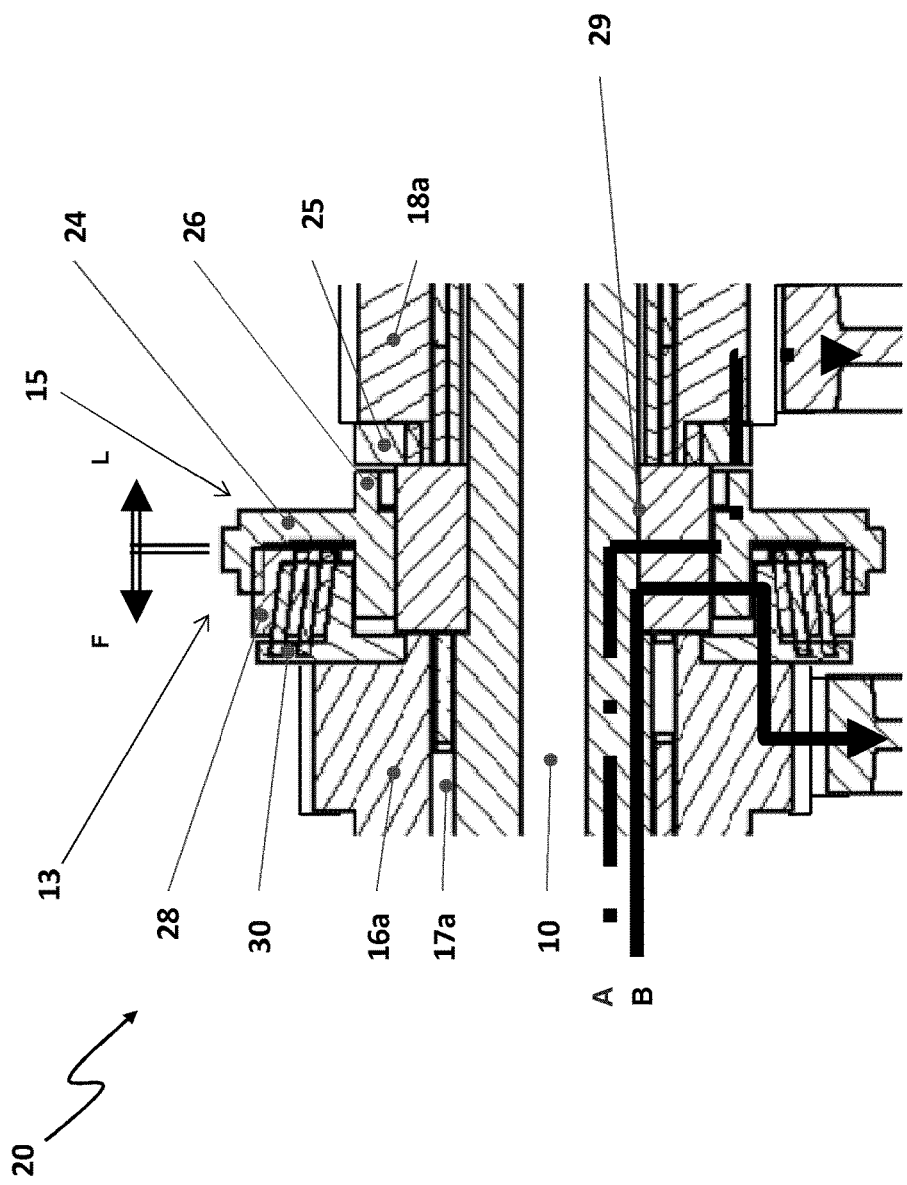
FIG. 2 is an enlarged view of a portion of FIG. 1.

Double activator 20 comprises a first side 13 and a second side 15 as shown in FIG. 2.

First side 13 comprises a first interface 28; first interface 28 is an activator friction interface 28 for frictionally engaging with a gear friction interface 30 of second floating gear 16a to form a friction device 28, 30. In the illustrated embodiment the friction device 28, 30 optionally comprising a cone clutch, as illustrated in FIG. 4. Preferably the friction device 28, 30 is a multiple plate cone clutch, however in other embodiments other structure are envisaged.

The second side 15 comprises a locking interface 26 for locking engagement with a gear locking interface 25 of third floating gear 18a to form a locking device 25, 26. The activator locking interface 26 comprises a plurality of dog teeth forming a dog ring which engage with the gear locking interface 25 which is formed as a dog ring having dog teeth provided on the third floating gear 18a for forming a dog clutch, the two dog gears being capable of mating or meshing together to form an interpositional fit.

Double activator 20 is capable of engaging with two different gears.

The double activators 20 and the single activators 19, 22 are slideably mounted upon the input shaft 10 so as to be slideable in an axial direction, for example using a spline 29. The double activator 20 can be moved along the input shaft 10 so as to engage and disengage the friction interface 28 with the gear friction interface 30, and to engage and disengage the locking interface 26 with the gear locking interface 25. The double activator 20 is provided with a neutral position, in which it is not engaged with either the second or third floating gears 16a, 18a. That is to say that both the friction interface 28 and locking interface 26 are disengaged from the respective ones of the second or third floating gears 16a, 18a.

When the double activator 20 is engaged with the third floating gear 18a, as indicated by direction arrow L, the locking interface 26 creates a first torque path A from the input shaft 10 to the output shaft 12.

When the double activator 20 is engaged with second floating gear 16a, as indicated by direction arrow F, the friction interface 28 creates a second torque path B from the input shaft 10 to the output shaft 12.

FIG. 3 illustrates the first single activator 19; first single activator 19 comprises a locking interface 26 for locking engagement with a gear locking interface 25 of first floating gear 14a. The locking interface 26 comprises a plurality of dog teeth forming a dog gear which engage with a dog gear having dog teeth provided on the first floating gear 18a for forming a dog clutch, the two dog gears being capable of mating or meshing together to form an interpositional fit.

FIG. 4 illustrates the second single activator 22; second single activator 22 comprises a friction interface 28, for frictionally engaging with a gear friction interface 30 of third floating gear 18a. In the illustrated embodiment the friction interface 28 comprises a cone clutch, as illustrated in FIG. 4.

The first and second single activators 19, 22 can slide along the input shaft 10 preferably on a spline 29.

The single activator 19 ensures that a locking interface 26 is provided for locking the first floating gear 14a to the input shaft 10.

The single activator 22 ensures that the third floating gear 18a can be in frictional engagement, via a friction interface 28, with the input shaft 10.

Returning to FIG. 1 the transmission system 8 optionally comprises torque sensors $Ts_1$, $Ts_2$. An optional first torque sensor $Ts_1$ mounted upon the input shaft 10. First torque sensor $Ts_1$ is disposed on the input shaft 10 at an axial position between the first floating gear 14a and the second floating gear 16a. An optional second torque sensor $Ts_2$ is mounted upon the input shaft 10. The second torque sensor $Ts_2$ is disposed on the input shaft 10 at an axial position between the second floating gear 16a and the third floating gear 18a.

In alternative embodiments it is envisaged that the first torque sensor $Ts_1$ may be mounted upon the output shaft 12, at a position $Ts_1'$ indicated by phantom lines, the position $Ts_1'$ is disposed between the first fixed gear 14b and the second fixed gear 16b. The second torque sensor $Ts_2$ may be mounted upon the output shaft 12, at a position $Ts_2'$ indicated by phantom lines, the position $Ts_2'$ is disposed between the second fixed gear 16a and the third fixed gear 18b.

It is envisaged that in alternative embodiments in which the transmission system 8 has a greater or lesser number of gear ratios that a torque sensor $Ts_1$, $Ts_2$ is provided at each location upon the input shaft necessary to allow a determination of the amount of torque transferred by each gear ratio of the transmission system 8.

The optional torque sensors $Ts_1$, $Ts_2$ when provided may be employed when shifting between two gear ratios. The provision of the torque sensors $Ts_1$, $Ts_2$ enables a measurement of the torque upon the input or output shaft 10, 12 to be made for a given axial position. This enables the torque path through the transmission system 8 to be determined. It is possible to determine whether or not a given device, either a friction device 28, 30 or locking device 25, 26 is being employed to transfer torque from the first input shaft 10 to the second, output shaft 12. For example, when changing between a first gear ratio and a second gear ratio it is possible to determine that a friction device 28, 30 being employed with the first gear ratio is no longer transferring torque from the input shaft 10 to the output shaft 12 and thus that the torque is being transferred by a friction device 28, 30 being employed on the second gear ratio that the friction device 28, 30 on the first gear ratio can be disengaged with minimal disturbance in torque being experienced. In another example the torques sensors $Ts_1$, $Ts_2$ may be employed when changing between a first gear ratio and a second gear ratio, wherein the first gear ratio employs the locking device 25, 26 to transfer torque between the input shaft 10 and the output shaft 12. The transmission system 8 then employs a friction device 28, 30, in slipping condition that is to say the activator friction interface 28 is rotating at a different speed to the gear friction interface 30, to engage the second gear ratio and the measurements of the torque on the input shaft 10 (or output shaft 12) can be used to determine when all of the torque delivered to the input shaft 10 by the engine is being transferred via the friction device 28, 30 of the second gear ratio. In some embodiments this is achieved by determining that zero torque is being transferred by the locking device 25, 26 coupled to the first gear ratio. Once the transmission system 8 has determined that the locking device 25, 26 of the first gear ratio is no longer transferring torque the transmission system 8 can release or disengage the activator locking interface 26 from the gear locking interface 25.

It will be appreciated that the torque sensors $Ts_1$, $Ts_2$ may be mounted upon the output shaft 12 at positions $Ts_1'$, $Ts_2'$ shown in phantom lines either in addition to or as an alternative to the torque sensors $Ts_1$, $Ts_2$ mounted upon the input shaft 10.

Figure 5:
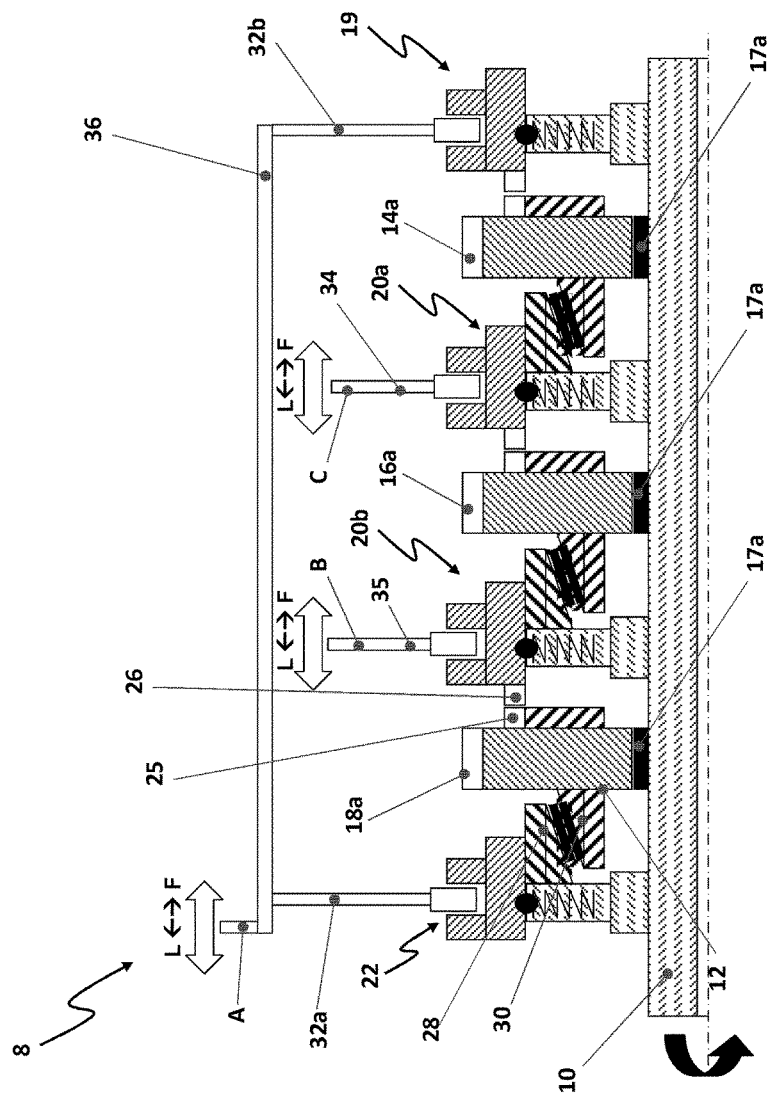
FIG. 5 is a schematic view of a transmission layout according to an embodiment of the invention.

FIG. 5 illustrates a transmission system 8 for a vehicle in which each of the first and second double activators 20a, 20b are coupled to a respective one of a first or second 34, 35 actuators, preferably the first and second actuators 34, 35 each comprise forks having a pair of legs in a substantially U-shaped configuration. The legs of the forks extend at least partially about the circumference of their respective double activators 20. The double activators 20 are provided with a recess or channel extending circumferentially about at least a portion of the respective one of the first or second double activators 20a, 20b circumference for receiving the first or second actuator 34, 35 respectively.

The single activator 19 is coupled to a third actuator 32b again preferably of a fork arrangement.

Single activator 22 is coupled to a fourth actuator 32a, again preferably of a fork arrangement.

In other embodiments the actuators 32a, 32b, 34, 35 may have a different shape and configuration.

The third and fourth actuators 32a, 32b are coupled together by a shaft or rail 36, in this way the first and second single activators 19, 22 effectively operate as a double activator, which is to say providing both a locking interface and a friction interface which are moved simultaneously, the friction interface engaging with a different gear to that engaged by the locking interface.

It will be appreciated that each floating gears 14a, 16a, 18a is activated or coupleable to the input shaft 10 by one, or both, of two different independent activators 19, 20, 22.

The floating gears 14a, 16a, 18a can be engaged by a friction interface 28 only, by a locking interface 26 only or by both a friction interface 28 and locking interface 26. The floating gears 14a, 16a, 18a may not be engaged by either the friction or locking interfaces 28, 26, that is to say they are free to rotate with respect to the input shaft 10.

Torque transfer from the input shaft 10 can be via the locking interface 26 or through the friction interface 28. Each side of a double activator 20a, 20b engages with a different floating gear 14a, 16a, 18a.

Any floating gear 14a, 16a, 18a may be fully locked to the input shaft 10 by its locking interface 26 (torque path A) and transmit full torque, or may be fully or partially locked to the input shaft 10 by its friction interface 28 torque (torque path B) and transmit full or partial torque.

The floating gears 14a, 16a, 18a need not be synchronous with the input shaft 10 but transmit torque through the friction interface 28 (torque path B) in a slipping condition. The floating gears 14a, 16a, 18a may be synchronous with the input shaft 10 and have either the locking interface 28, the friction interface 28, or both, in an active or engaged condition, by different activators 20, 19, 22; however the locking interface 28 and/or the friction interface 28 may not be transmitting any torque.

One advantage of the present invention is that friction interfaces 28 are always available, and avoids the requirement for a friction device (clutch) between the engine or motor of the vehicle and the transmission system 8.

The present invention provides that changing gear, changing from one gear ratio to another different gear ratio, can be achieved without interrupting the torque transmission (sometimes called a "powershift") using the friction interfaces 28 of two or more different activators 20a, 20b, 19, 22 on two or more different floating gears 14a, 16a, 18a. In a powershift the torque path from the input shaft 10 to the output shaft 12 changes from one gear to another with an uninterrupted torque transfer.

In order to change the gear ratio in use by the transmission system 8 from one to another the following exemplary method may be used.

The transmission system 8 is engaged with a third floating gear 18a, the third floating gear 18a is in locking engagement with the second double activator 20b, see FIG. 5, that is the dog clutch is engaged between the third floating gear 18a and second double activator 20b. With the dog clutch engaged the friction clutch of the second single activator 22 is brought into engagement with the first floating gear 18a. The second double activator 20b then releases the third floating gear 18a such that the third floating gear 18a is engaged only by the friction clutch of the second single activator 22.

The friction interface 28 of the first double activator 20a is then brought into engagement with friction interface 28 of first floating gear 14a. Torque from the engine or motor is now being transmitted to the output shaft via the third floating gear 18a. The speed of rotation of the input shaft is substantially unchanged, there will be relative movement or 'slip' between friction interface 28 of the first floating gear 14a and the friction interface 30 of the first double activator 20a. The relative movement or 'slip' will be reduced until the first floating gear 14a is synchronous with the input shaft 10, by further engaging the friction clutch by increasing the pressure between the friction interfaces 28, 30.

Once the first floating gear 14a is substantially synchronised with the input shaft 10, the locking interface 26 of the first single activator 19 is brought into locking engagement with the locking interface of the first floating gear 14a. In some embodiments it is desirable to maintain a degree of slip, relative movement between the first floating gear 14a and the input shaft 10, in order ensure the teeth of the dog ring on the first floating gear 14a are received in recesses in the dog ring of the second single activator 19 and the teeth of the dog ring on the second single activator 19 are received in recesses in the dog ring of the first floating gear 14a.

An alternative method of engaging the locking device 25, 26 is described hereinafter with reference to FIGS. 14 to 16. It is envisaged that the transmission system 8 may be configured to employ both methods. The transmission system 8 may determine which method to use based upon specified input criteria, for example a user selection, vehicle condition or characteristic or assessment of environment of use.

The friction interface 28 of the first double activator 20a is then disengaged from the friction interface 30 of the first floating gear 14a to complete the change in gear ratios.

It will be appreciated that since the friction interfaces and locking interfaces of each gear are controllable independently of one another alternative methods of changing gear ratios exist.

For example in the foregoing description of the gear change or shift the step of frictionally engaging the outgoing gear, in the previous example this was the third floating gear 18a, with the friction interface 28 of the second single activator 22 may be omitted. In which case the friction interface 30 of the incoming gear, first floating gear 14a in the example above, will be engaged by the friction interface 28 of the first double activator 20a before the dog clutch or locking interfaces 25, 26 of the outgoing gear are disengaged.

Furthermore when transferring torque from one gear ratio to another it may be desirable to engage the friction interfaces 28, 30 between additional gear ratios, other than the incoming gear ratio and the outgoing gear ratio.

The transmission system 8 is efficient since the floating gears 14a, 16a, 18a can be maintained in engagement with the input shaft 10 without requiring a continuous energy supply for example maintaining pressure or continuously applying force to the clutch plates as required by automatic transmission systems; this is achieved using the locking interfaces 25, 26. These locking interfaces 25, 26 rely upon the geometry of the locking device, dog clutch, to remain in the engaged position.

The transmission system 8 may be employed to provide a hill hold function by locking one floating gear 14a, 16a, 18a with a locking interface 26 of an appropriate activator 20, 19, 22 and engaging another floating gear 14a, 16a, 18a using the friction interface 28 with different activator 20, 19, 22.

Figure 6:
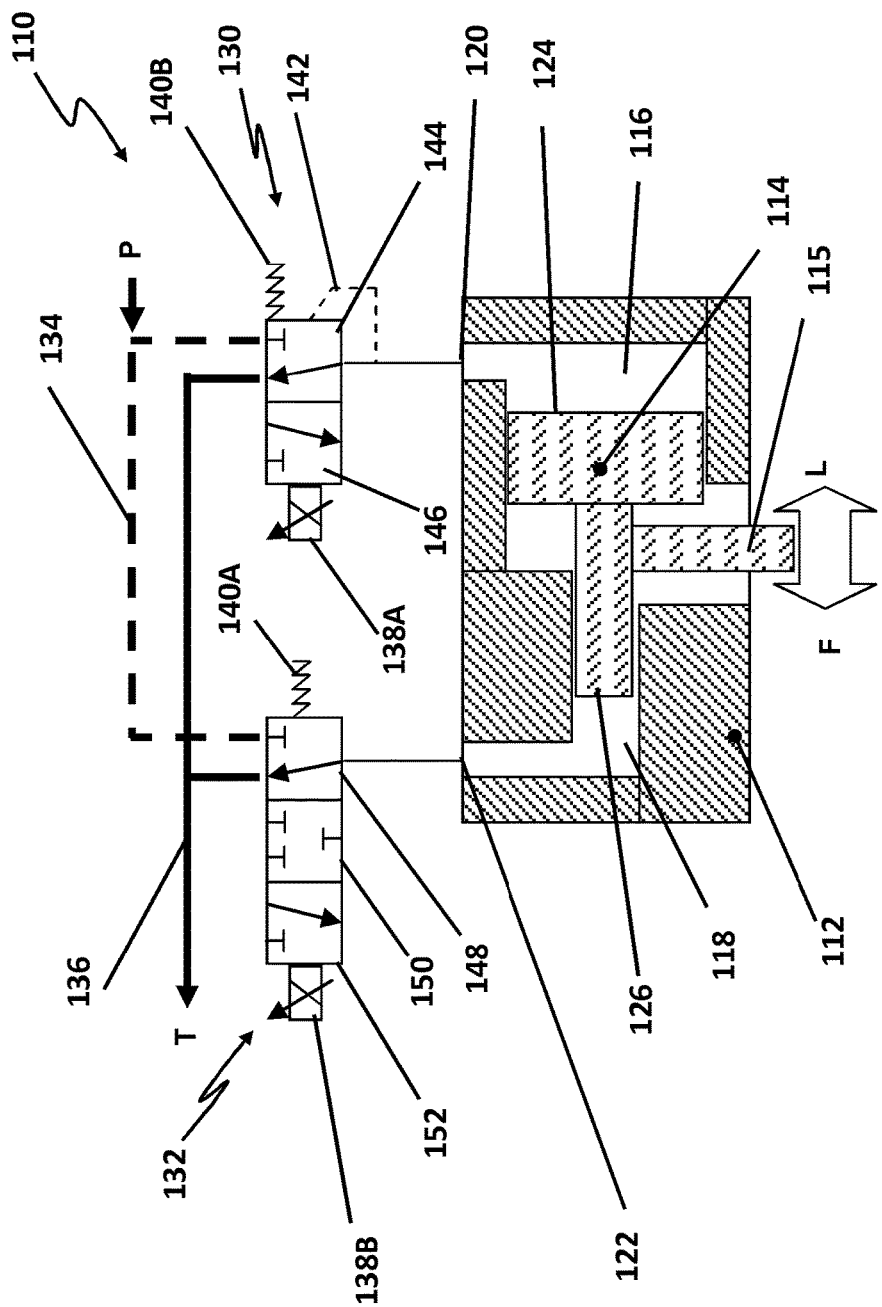
FIG. 6 is a schematic view in cross section of a machine for applying an axial force to an activator.

FIG. 6 illustrates a machine 110 for providing movement of the single activators 19, 22 and double activators 20a, 20b.

The machine 110 comprises a piston 114 disposed within a cylinder or housing 112.

The housing 112 comprises a first chamber 116 and a second chamber 118, each taking a respective port 120, 122 for ingress and egress of a fluid.

A piston rod 115 is coupled to the piston 114; the piston rod 115 is mounted perpendicularly to the piston 114 and extends through an aperture in the housing 112. In alternative embodiments other arrangements are envisaged for example the piston rod may be mounted collinearly with the piston and extend through an aperture in one of the end wall of the housing 112 rather than a side wall as illustrated. The housing 112 forms a double acting cylinder which can move the piston back and forth in a linear fashion by injecting pressurised fluid into a respective one of the first or second chambers 116, 118.

The piston comprises a first surface 124 having a first area dimension and a second surface 126 having a second area dimension. First area dimension is greater than second area dimension. Therefore when the pressure of the fluid applied to the first and second surfaces 124, 126 is the same, the force exerted in the direction indicated by direction arrow F is greater than that exerted in the direction indicated by direction arrow L.

Preferably, the machine 110 is arranged such that the piston rod 115, when moved in the direction indicated by direction arrow F, engages the friction interface 28 of one of the single or double activators 20a, 20b, 22 with the friction interface of one of the friction gears 14a, 16a, 18a. This is achieved by injecting fluid into first chamber 124 to apply pressure to first surface 124 whereby generating a force in the direction indicated by direction arrow F. The machine 110 can apply a greater force in the direction indicated by arrow F than in the direction indicated by direction arrow L. The machine 110 is preferably arranged such that when moving the piston rod 115 in the direction indicated by arrow L the single or double activator 19, 20a, 20b engages the locking interface 25 of the respective activator 19, 20a, 20b with a floating gear 14a, 16a, 18a. This has the advantage of being able to rapidly engage the locking interface 25 when moving in this direction for a given fluid flow rate, this is due to the smaller volume per unit length of the second chamber than the first chamber.

It is envisaged that a machine 110 will be coupled to the each of rods A, B and C in the transmission system 8 of FIG. 5.

The machine 110 comprises a pair of valves 130, 132 coupled to the ports 120, 122 respectively by respective conduits or pipes. The valves 130, 132 are illustrated in a de-energised condition. Valves 130, 132 are each coupled to fluid pressure source P such as a fluid pump and to a fluid reservoir or tank T.

Valve 130 is preferably a solenoid valve comprising 3 ports and having 2 positions.

Valve 132 is preferably a solenoid valve comprising 3 ports and 3 positions.

Valve 130 comprises a first position 144 in which fluid may flow from the first chamber 116 via port 120 to the tank T.

Fluid flow from the pump P is blocked or prevented since the conduit from the pump P is terminated. Valve 130 comprises a second position 146 in which flow may flow or be pumped from the pump P into the first chamber 116, fluid flow to or from the tank T is blocked or prevented.

A spring or other suitable resilient device 140B biases the valve 130 to be in the first position 144. Valve 130 comprises a feedback loop 142 coupled between the first position 144 of the valve 130 and the conduit between the valve 130 and the port 120.

Valve 132 comprises a first position 148, in which the port 122 is fluidically coupled to the tank T, allowing fluid flow to/from the tank T. In the first position 148 fluid flow from the pump P is blocked or prevented by a termination. A spring or other resistant device 140 biases the valve 132 into the first position 148.

Valve 132 comprises a second position 150 in which fluid flow is prevented or blocked between the second chamber 118 and the tank T and fluid flow is blocked between the pump P and the second chamber 118.

Valve 132 comprises a third position 152 in which the pump P is coupled to the second chamber 118 and the conduit or fluidic path coupling the valve 132 to the tank T is terminated or blocked.

In order to move the piston rod 115 in the direction indicated by direction arrow F, a force applied to the first surface 124 by the fluid in the first chamber 116 must be greater than a force applied to the second surface 126 by the fluid in the second chamber 118. This is achieved by activating the solenoid 138A to move the valve 130 into the second position 146, such that fluid may be pumped into the first chamber 116. The pressure created in the first chamber 116 forces the piston 114 in the direction indicated by arrow F. Fluid in the second chamber 118 is forced out through the valve 132, in the first position 148 and into the tank T.

In order to stop the piston 114 moving in the direction indicated by arrow F, the valve 132 is activated to be in the second position 150 such that fluid flow into or out of the second chamber 118 is prevented, the motion of the piston 114 is stopped due to the resistance of the fluid in the second chamber 118 to being compressed by the piston 114.

In order to move the piston 114 in the direction indicated by arrow L a force on the second surface 126 exerted by fluid in the second chamber 118 must be greater than a force exerted on the first surface 124 by fluid in the first chamber 116, this is achieved by activating the solenoid 138B on the second valve 132 so as to employ a third position 152, whereby coupling the pump P to the second chamber 118 and deactivating the solenoid 138A of the first valve 130, such that the first position 144 is employed whereby coupling the first chamber 116 to the tank T.

Fluid can then be injected into the second chamber 118 by the pump P and ejected from the first chamber 116 by the movement of the piston 114 such that the piston 114 moves in the direction indicated by arrow L, that is to say, moving the first surface 124 towards the adjacent end wall of the housing 112.

In order to stop the piston 114 moving in the direction indicated by arrow L the first valve 130 activates the solenoid 138A to employ the second position 146 such that the pump P pumps fluid into the first chamber 116. Due to the greater area of the first surface 124 than that of the second surface 126; the force applied to the first surface 124 is greater than the force applied to the second surface 126, whereby slowing and stopping movement of the piston 114.

Optionally, the second valve 132 may be activated to employ the second or first positions 150, 148 to prevent fluid flow into the second chamber 118.

The first valve 130 controls the pressure of the fluid applied to the first chamber 116 and hence the first surface 124 of the piston 114. The second valve 132 controls the fluid flow to the second chamber 118.

In an alternative embodiment the piston 114 may be arranged such that the first surface 124 and second surface 126 have an equal area.

An advantage of the illustrated embodiment in which the area of the first surface 124 is greater than the area of the second surface 126 is that a fail-safe feature can be provided in event of the valve failure. In the event of failure of first valve 130 the second valve 132 can be positioned in second position 150 whereby immobilising the piston 114. In the event of failure of second valve 132 valve for example second valve 132 is stuck in third position 152 in which fluid is injected into the second chamber 118 the first valve can be positioned in second position 146 in which fluid is injected into the first chamber 116, due to the fact that the area of first surface 124 is greater than the area of second surface 126 the force applied by the fluid in the first chamber 116 in the direction indicated by direction arrow F is greater than the force applied to the second surface in the direction indicated by direction arrow L by the fluid in the second chamber 118.

Second valve 132 controls the flow rate of the fluid into and out of the second chamber 118; thereby the second valve 132 controls the speed and direction of movement of the piston 114 in both the F and L directions.

Valve 130 controls the pressure of the fluid applied to the first surface 124, and therefore when moving the piston 114 in the direction F the valve 130 controls the force applied to the friction interface 30 of the floating gear 14a, 16a, 18a by the friction interface 28 of the single or double activator 19, 20a, 20b. By controlling the pressure applied to the first surface 114 the characteristics of a change or shift in gear ratios can be controlled. For example, if not enough pressure is applied then there will be relative movement between the friction interface 48 of the activator 19, 20a, 20b and the friction interface 30 of the floating gear 14a, 16a, 18a; in which case energy may be lost as heat due to friction between the friction interfaces 28, 30.

If too much pressure is applied too quickly then the transfer of torque onto incoming gear will be rapid, this may be manifested as a jerk or jolt experience by the transmission system 8.

Turning now to FIGS. 7 and 8, there is illustrated a plot of the pressure/force versus the current of a typical hydraulic pressure valve. The pressure/force achieved for any given value of current applied to the solenoid is different depending upon whether the current is increasing or decreasing, this hysteresis problem can be substantial at lower values of current when trying to control smaller pressure values. The problem of hysteresis in the pressure valve can be overcome as shown in the embodiment of FIG. 8.

In the embodiment of the activator 320a of FIG. 8, the activator 320a comprises a locking interface 326 and a friction interface 328 which are mounted upon a body 329.

Body 329 is mounted on a support 360 in rolling or sliding contact to form a detent, for example by one or more balls 364, the balls 364 are mounted upon a spring or other resilient device 362 within the support 360, such that at least a portion of the balls 364 can be received within the support 360 when the spring 362 is compressed. The balls 364 are biased against the body 329.

The body 329 comprises a recess or ramp 366 which engages with the balls 364 when moving the friction interfaces 328, 330 into engagement. The ramp 366 introduces a force which must be overcome when engaging the friction interface 328; this is due to the fact that the spring 362 must be compressed.

The ramp 366 is arranged such that when moving the body 329 to engage the friction interface 328 with the friction interface 330 the activator 320a and hence the machine 110 to which it is coupled must overcome the force exerted by the spring 362 upon the body 329. This in turn requires the piston/cylinder machine 110 to exert sufficient force to overcome the spring force. In doing so, the piston 114 must apply a greater force/pressure to the activator 320a than it would otherwise need without the ramp 366 forcing the spring 362 into compression. This requires a greater pressure of fluid in the first chamber 116. In doing so, the pressure valve 130 operates at higher pressure values and requires greater current load. This has the effect of operating the pressure valve 130 in the region 2 of the graph of FIG. 7, where the hysteresis problem is reduced or eliminated.

The transmission system 8 preferably comprises a system for adaptively changing adaptive torque transfer function employed by the transmission system 8 to determine the requested pressure required between the friction interfaces 28, 30 to deliver a specified amount of torque. Each of the friction interfaces 28, 30 in the transmission system 8 can be defined by a relationship or torque transfer function between the pressure between the friction interface 28 and friction interface 30 and the torque transferred through them.

The torque transfer function, the relationship between pressure and torque, is dependent upon many parameters of the transfer path and working conditions of the transmission system 8 for example the temperature, degree of slip or relative movement between the friction interface 28 and friction interface 30, the torque transfer function will be different for different friction interfaces 28, 30. The torque transfer function is also subject to change due to wear of the components during use.

Therefore embodiments of the present invention provide an adaptive or learning system for improving or maintaining the transmission systems performance. In particular to ensure that for a given pressure applied to between respective ones of the friction interfaces 28, 30 the torque transferred is substantially the same as expected by the system 8. Or alternatively that for a required degree of torque to be transferred the system 8 can apply the current amount of pressure between the function interfaces 28, 30.

In order to adapt or monitor the torque transfer function of a particular pair of friction interfaces 28, 30 it is desirable to know the force applied between the friction interfaces 28, 30 and the amount of torque transferred for that force value. It may not be possible to measure the value of torque transferred between the friction interfaces 28, 30 or the force applied therebetween; however in many systems it may be possible to obtain a value indicative of the torque being delivered to the transmission system 8 by the engine or motor and read the value of a control parameter controlling the force applied between the friction interfaces, for example a current value, or approximation thereto, of the current drawn by the pressure control valve 130. It is therefore desirable for any given value of torque delivered to the transmission system 8 to be able to update the control parameter value stored in a database of a control system (not shown) coupled to the transmission system 8 in order that the transmission system 8 applies sufficient force between the friction interfaces 28, 30 to optimise the transfer of torque between the first shaft 10 and the floating gears 14a, 16a, 18a and hence through the transmission system 8.

Figure 10:
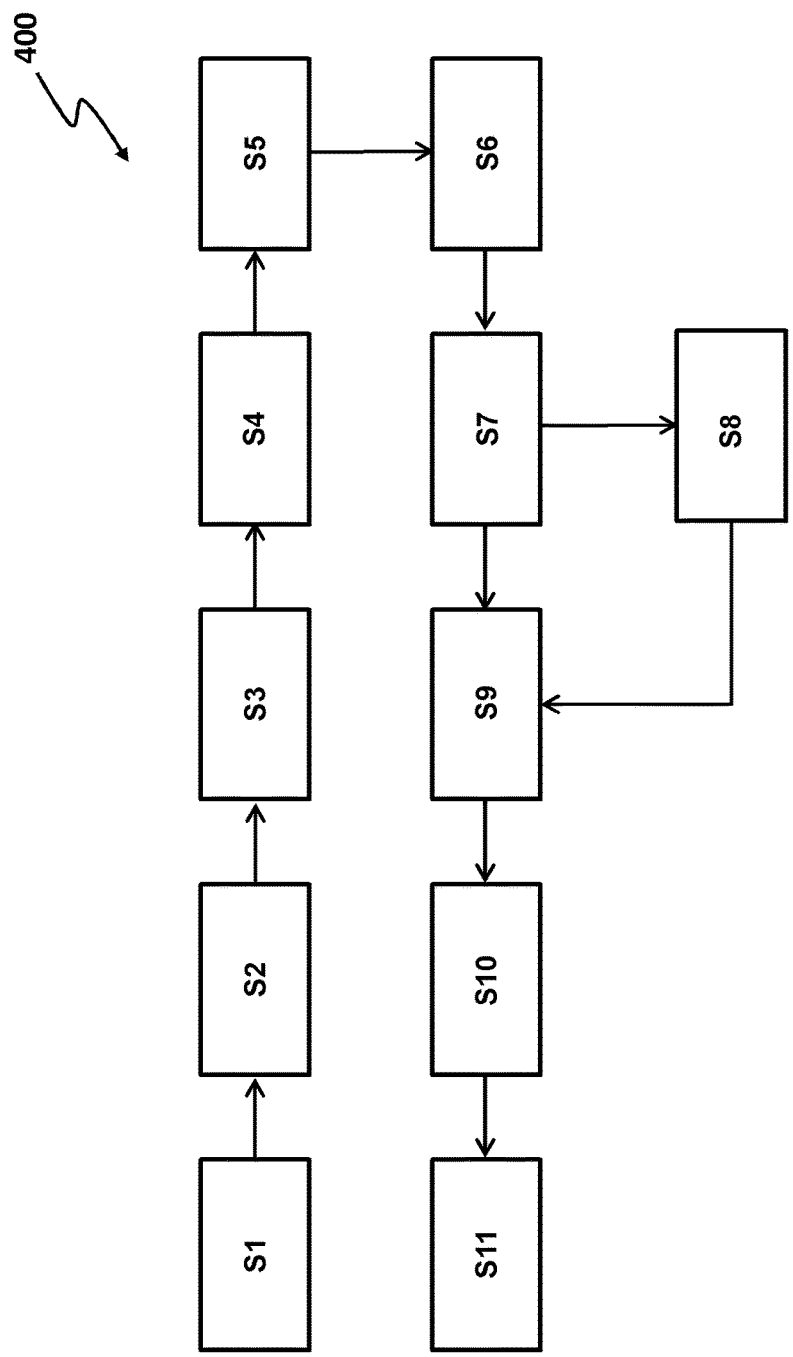
FIG. 10 is a flowchart illustrating the steps of a method for adapting the torque transfer friction system of FIGS. 1 to 5.

The system 400, shown in FIG. 10 can determine the torque transfer function of a given pair of friction interfaces 28, 30 using the following procedure;

Whilst operating the transmission system 8 in any given gear to be tested and preferably in stable conditions for example, motorway driving at constant speed.

The adaptive system 400 initiates a swap or change of the torque path. The transmission system 8 ceases using the locking interfaces 25, 26 to employ the friction interfaces 28, 30. This is done by engaging the friction interfaces 28, 30 and subsequently disengaging the locking interfaces 25, 26. The force or pressure applied to the friction interfaces 28, 30 is preferably greater than that required to achieve the current torque value being transferred by the locking interfaces 25, 26.

The transmission system 8 then reduces the force or pressure applied to the friction interfaces 28, 30 by reducing force or pressure applied to the first interfaces 28, 30 by reducing the pressure applied to the first surface 124 of the piston 114 of the machine 110 by the fluid. The pressure of the fluid is reduced until the transmission system 8 experiences a predefined degree of slip, preferably a small degree of slip, 'micro slip'; for example until the rotational speed of shaft 10 is 5, 10, 15 rpm higher than the rotational speed of the floating gear 14a, 16a, 18a under test.

The adaptive system 400 receives or interrogates an engine/motor management system (not shown) controlling the engine or motor which is coupled to the transmission system 8 to obtain a value indicative of the torque being delivered by the engine or motor.

The adaptive system 400 has obtained a value indicative of the torque being transferred by the transmission system 8 and a value of a control parameter necessary for the transmission system 8 to achieve that torque capacity.

These values indicative of the torque and force or pressure can be compared to torque and values stored as a look up table, or other predefined torque transfer function of the transmission system 8, in a memory device. The adaptive system 400 can modify the torque transfer function or look up table values to incorporate the measured or recorded values.

Figure 9:
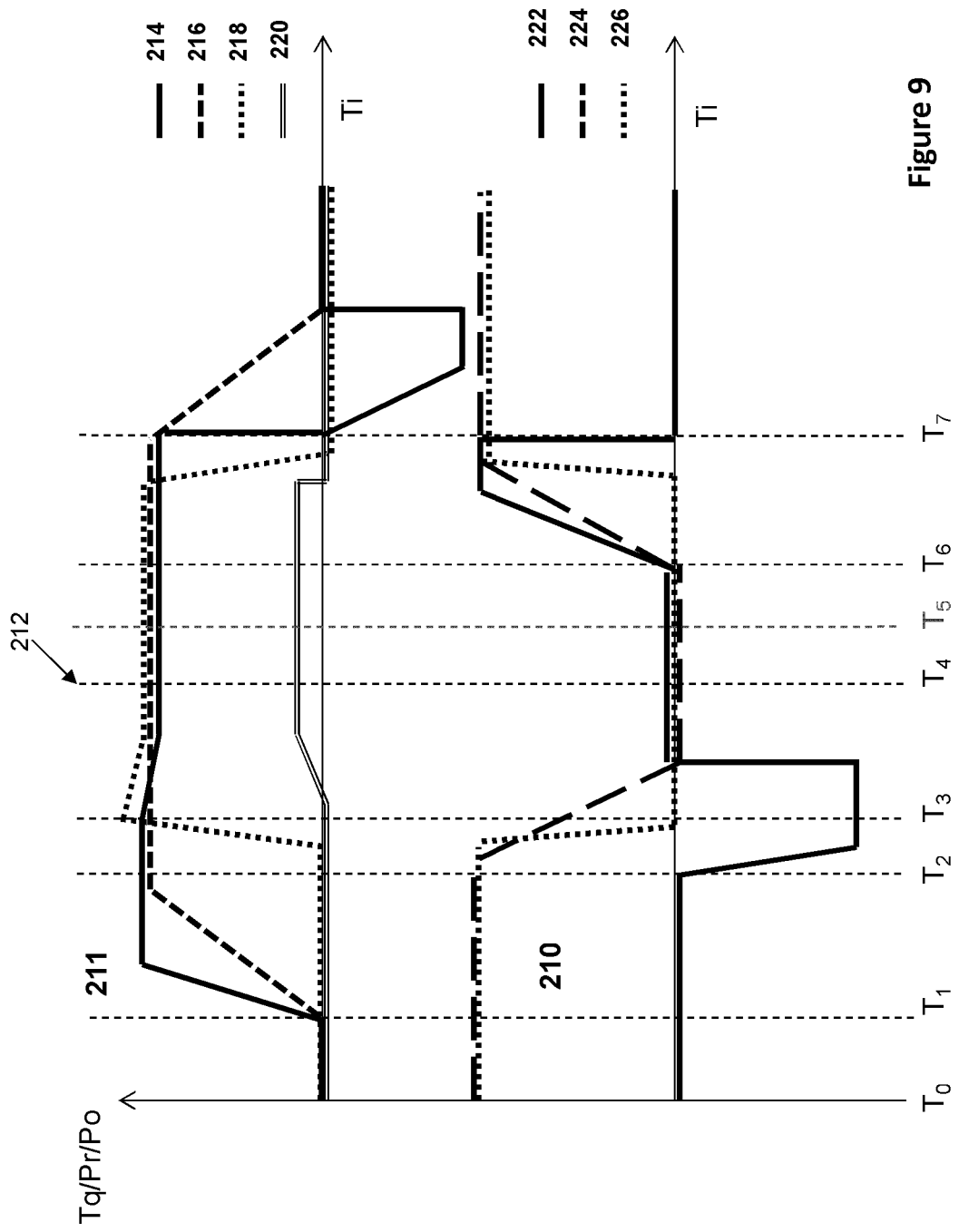
FIG. 9 is a graph of the pressure, position, torque transfer and slip of the friction interface with respect to time during a measurement cycle.

FIG. 9 illustrates a graph showing the adaption process. The upper axes 211 relate to the actions of the friction interfaces 28, 30 and the lower axes 210 relate to the actions of the locking interfaces 25, 26 of the gear under test. Line 214 indicates the changes to the pressure of the friction interfaces 28, 30. Line 216 reflects the position of the friction interface 28. Line 218 reflects the torque capacity through the friction interfaces 28, 30. Line 220 illustrates the degree of slip or relative movement between the friction interface 28 of the activator 19, 20a, 20b and friction interface 30 of the gear under test.

Line 222 illustrates the pressure applied to the locking interfaces 25, 26. Line 224 illustrates the position of the locking interface 25. Line 226 illustrates the degree of torque capacity through the locking interfaces 25, 26.

At time $T_0$ the friction interfaces 28, 30 are disengaged and the locking interfaces 25, 26 are engaged with the floating gear 14a, 16a, 18a under test.

At time $T_1$ the adaptive system 400 instructs the transmission system 8 to engage the friction interfaces 28, 30, pressure is applied by the machine 110, until a sufficient value exceeding that required to transfer the current torque being transferred to the floating gear 14a, 16a, 18a under test. This application of pressure or force to the friction interface 28 brings it into contact with the friction interface 30. In doing so, torque is transferred to the floating gear 14a, 16a, 18a under test via the friction interfaces 28, 30.

At time $T_2$ the adaptive system 400 applies pressure to the locking interfaces 25 in order to disengage. This is to say the respective machine 110 coupled to the activator 20a, 20b, 22 which controls the floating gear 14a, 16a, 18a under test is moved in the direction indicated by direction arrow F by injecting pressurised fluid into the first chamber 116.

In doing so the locking interface 25 is disengaged from its position of interposition with the locking interface 26. The torque transferred to the floating gear 14a, 16a, 18a under test via the locking interfaces 25, 26 is reduced to zero.

At time $T_3$ the adaptive system 400 reduces the pressure applied to the friction interfaces 28, 30. The friction interfaces 28, 30 then experience relative rotational movement with respect to each other.

This reduces the value of torque capacity. The transmission system 8 is held in this condition until time $T_5$.

At time $T_4$ the value of torque and pressure are recorded. Optionally at time $T_5$, the adaptive system 400 may increase the pressure applied to the friction interfaces 28, 30 to eliminate the slip between them, and increasing the torque value transferred (not shown in the Figure).

The adaptive system 400 instructs the transmission system 8 to re-engage the locking interface 25 of the requisite activator 19, 20a, 20b with the locking interface 26 of the gear under test at time $T_6$. Torque is now transferred to the floating gear 14a, 16a, 18a under test via the locking interfaces 25, 26.

At time $T_7$ the adaptive system 400 instructs the transmission system 8 to reduce pressure to the friction interface 28. That is to say fluid under pressure is injected into the machine 110 controlling the respective activator 19, 20a, 20b activating the friction interface 28 of the floating gear 14a, 16a, 18a under test such that the machine 110 moves the piston in the direction indicated by direction arrow L. This is achieved by injecting the fluid into the second chamber 118 to apply force to the second surface 126.

This disengages the friction interface 28 from the friction interface 30. The torque transferred to the floating gear 14a, 16a, 18a under test is reduced to zero.

In some embodiments a direct measurement of the pressure value is not made, the current value drawn by the pressure valve 130 or other system component is used a measurement which is indicative of the pressure value.

It will be appreciated that when employed in a vehicle the adaptive system may instigate a measurement cycle at any time, preferably under steady state or stable conditions.

It will be appreciated that during the measurement cycle the vehicle may be requested; for example by the driver or other vehicle system to change the gear ratio. In such circumstances the transmission system 8 would cease the measurement cycle in progress and effect a change in gear ratio. Depending upon the timing of shift request within the measurement cycle the transmission system 8 may not need to disengage the locking interfaces 25, 26 of the current gear ratio before engaging the friction interfaces 28, 30 of the current gear. The transmission system 8 would shift the gear ratio by transferring the torque from the friction interfaces 28, 30 of the current, outgoing gear ratio to the friction interfaces 28, 30 of the oncoming gear ratio.

FIG. 10 illustrates a flow chart of the adaptive system 400 for monitoring and updating the torque transfer friction of any given pair of friction interfaces 28, 30.

S1. Detect stable conditions of operation, initiate measurement cycle of torque transfer function.

S2. Engage the friction interfaces 28, 30 of the current gear ratio in use, the gear under test.

S3. Disengage the locking interfaces 25, 26 of the current gear ratio, gear under test.

S4. Reduce pressure applied to friction interfaces 28, 30 to introduce 'micro slip'.

S5. Wait until transmission system 8 is in stable condition.

S6. Measure, receive or record a torque value and a force or pressure value or alternatively a value indicative of the torque and a value indicative the force or pressure.

S7. Compare measured values of torque and pressure to stored values for measured friction interfaces. S8 follows if difference detected, otherwise S9 follows. In some embodiments S8 may always follow S7 irrespective of whether or not the measured value and the stored values are the same or different.

S8. Update stored values with new measured values.

S9. Increase pressure between friction interfaces 28, 30 on gear ratio in use, gear under test.

S10. Re-engage the locking interfaces using separate activator 19, 20a, 20b for the gear under test.

S11. Disengage the friction interfaces 28, 30 on the gear under test.

Figure 12:
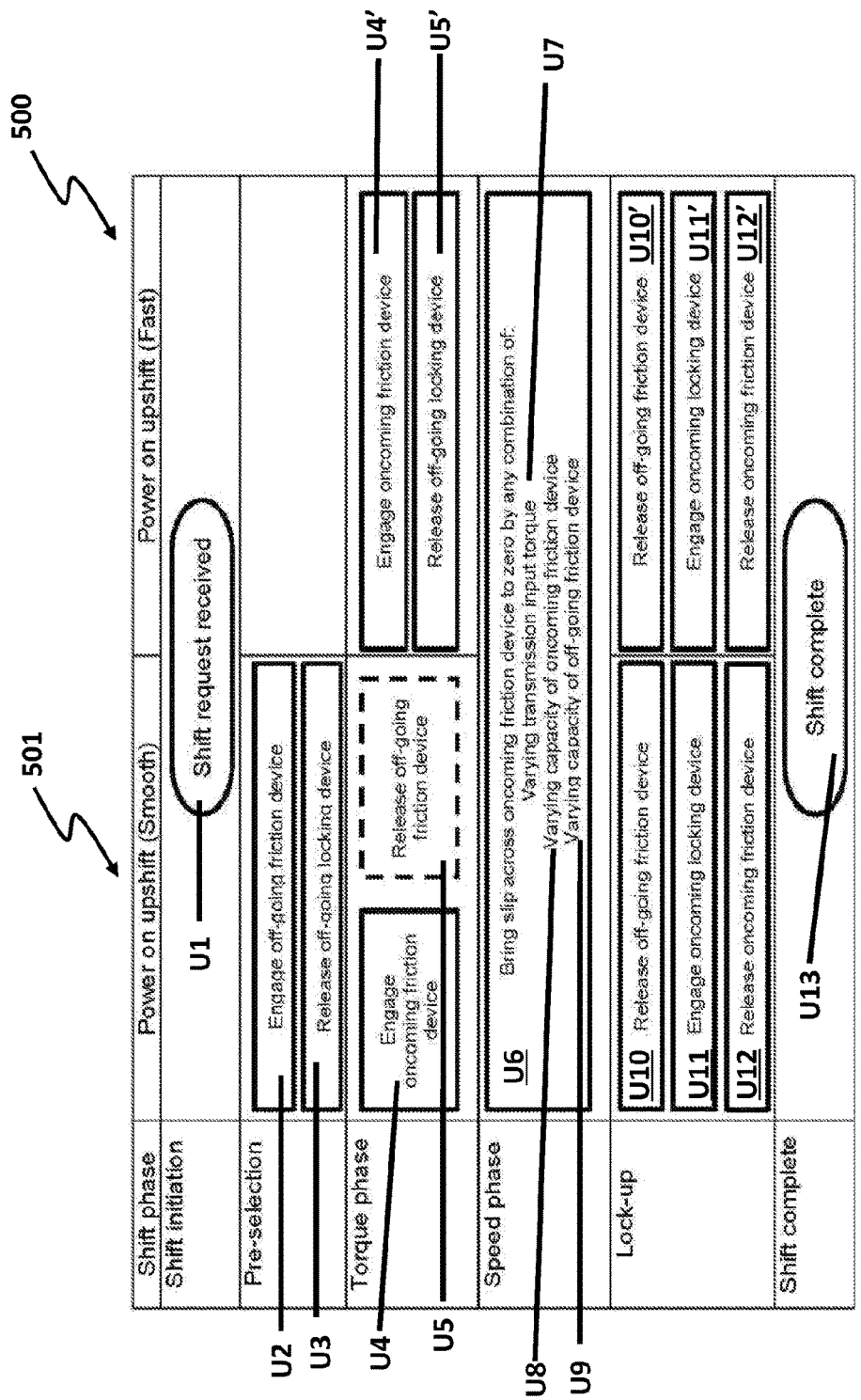
FIG. 12 is a table illustrating the steps of two alternative methods for upshifting gear ratios according to embodiments of the invention.

FIG. 12 illustrates two alternative powershifting methods for changing between two different gear ratios; the sequence of events is adapted for upshifting, that is to say changing between a first gear ratio and a second higher gear ratio. A first upshift method 501 is illustrated, the first upshift method 501 is adapted so as to provide a gear change having a smooth characteristic, this first upshift method 501 changes the gear ratio with a reduced or minimal disturbance in the torque delivery between the input shaft 10 and the output shaft 12, that is to say that the variations in the torque transferred between the input shaft 10 and the output shaft 12 during a change between gear ratios are minimised.

A second upshift method 500 is illustrated in FIG. 12; the second upshift method 500 is adapted so as to provide a gear change having a fast characteristic, this second upshift method 500 changes the gear ratio with maximum performance, second upshift method 500 minimises the delay or time taken to change between the first gear ratio and the second gear ratios. The second upshift method 500 reduces or minimises the changeover time period, the time period when the path through the transmission system 8 which the torque is transferred between the input shaft 10 and the output shaft 12 is being changed, that is to say the time period to switch from employing the first gear ratio for transferring torque between the input shaft 10 and output shaft 12 to employing the second gear ratio for transferring torque between the input shaft 10 and output shaft is minimised.

Figure 11:
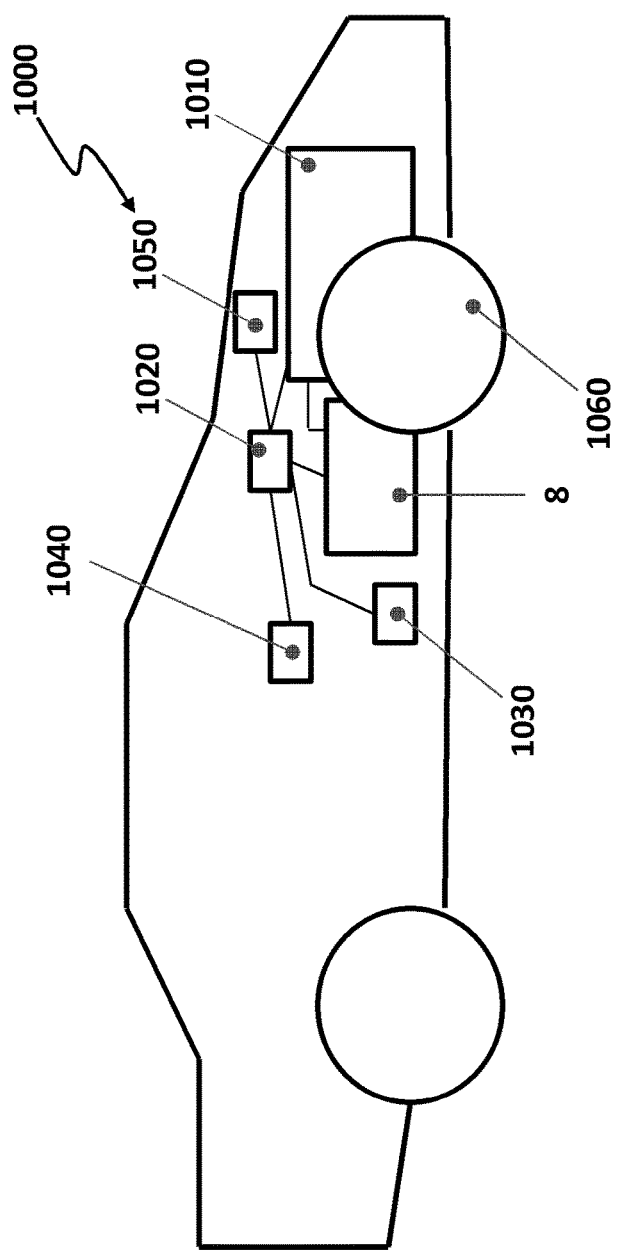
FIG. 11 is a schematic view of a vehicle comprising the transmission system of FIG. 1.

In some embodiments it is envisaged that the transmission system 8 will be configured to carry out both the first upshift method 501 and the second upshift method 500, and that the method employed may be dependent upon input criteria. For example, a vehicle 1000, shown in FIG. 11 comprises an engine or motor 1010 coupled to the transmission system 8. The transmission system 8 is coupled to a user selectable control interface 1040 via a control unit 1020 such that the user may select which method of shifting gear is employed. In other embodiments the control unit 1020 may select the method employed based upon data available from sensors 1050 mounted on the vehicle 1000 and coupled to the control unit 1020, which sensors 1050 may be indicative of the environmental conditions for example data from a temperature sensor, indicating a high likelihood of ice on a road surface, or a rain sensor. Alternatively, the sensors 1050 may provide data indicative of the condition of the vehicle 1000.

The vehicle 1000 comprises a user input device 1030 such as an accelerator foot pedal. For example the driver may press down upon the foot pedal requesting an increase in vehicle speed. The control unit 1020, receives data from sensors (not shown) coupled to, or mounted upon, the engine or motor 1010. The data is indicative of the operating conditions of the engine or motor 1010, such as the current number of revolutions per minute of the engine crankshaft or flywheel. The control unit 1020 also receives or retains data concerning the currently selected gear ratio, the gear 14a, 16a, 18a currently being employed by the transmission system 8. This off-going gear 14a, 16a, 18a is engaged by its respective locking device 25, 26; the off-going gear is the gear which is to be disengaged.

The control unit 1020 employs the received data to determine that a change in gear ratio is desirable, either for delivery of the performance requested by the user or to operate the vehicle 1000 efficiently. The control unit 1020 determines which gear 14a, 16a, 18a is to be engaged, this is the on-coming gear 14a, 16a, 18a. The control unit 1020 generates a shift request U1 which is sent to the transmission system 8.

The first upshift method 501 is initiated by a shift request U1; the shift request U1 is received by the transmission system 8 from the control unit 1020. In alternative embodiments the shift request U1 may be received from other vehicle components.

Upon receipt of a shift request U1 the transmission system 8 enters a preselection phase, in the preselection phase the transmission system 8 engages the friction device 28, 30 of the off-going gear 14a, 16a, 18a, as illustrated by step U2. The transmission system 8 then disengages the locking device 25, 26 of the off-going gear, step U3, such that all torque delivered to the transmission system 8 by the engine is transferred from the input shaft 10 to the output shaft 12 by the friction device 28, 30 of the off-going gear 14a, 16a, 18a and there is substantially zero torque transferred from the input shaft 10 to the output shaft 12 by the locking device 25, 26 of the off-going gear 14a, 16a, 18a.

The transmission system 8 then enters a torque phase during which the torque transfer from the input shaft 10 to the output shaft 12 is changed from being transferred through the off-going gear 14a, 16a, 18a to the on-coming gear 14a, 16a, 18a. The friction device 28, 30 of the on-coming gear 14a, 16a, 18a is engaged, step U4, that is to say the plates of the clutch are pressed together in frictional engagement. Optionally, during torque phase the friction device 28, 30 of the off-going gear 14a, 16a, 18a may be released, step U5.

The transmission system 8 then enters a speed phase during which the speed of rotation of the input shaft 10 is matched to the speed of the output shaft 12, step U6. At the start of this phase the friction device 28, 30 experiences a 'slip', the plate or plates of one side of the clutch are moving, rotating, with respect to the plate or plates of the other side of the clutch. During the speed phase the difference in rotational speed between the two sides of the friction device 28, 30 of the on-coming gear 14a, 16a, 18a is reduced to zero, such that there is no 'slip'.

This can be achieved by varying the input torque transmitted to the transmission system 8, step U7, that is to say reducing the torque produced by the engine 1010 and therefore reducing the torque on the input shaft 10 of the transmission system 8. In a vehicle employing a combustion engine this is achieved by reducing the rotational speed of the crankshaft engine 1010 (reducing the charge, fuel/air mixture, inserted into the engine cylinders); in a vehicle employing an electric motor the torque is reduced by reducing the rotational speed of the driveshaft, this may achieved by reducing the voltage across the motor or current. This may be achieved for example by repeatedly switching the voltage or current on and off with a transistor.

Additionally or alternatively, the slip between the two sides of the friction device 28, 30 of the on-coming gear 14a, 16a, 18a may be reduced to zero by varying the torque capacity of the friction device 28, 30 of the on-coming gear 14a, 16a, 18a, step U8, for example this can be achieved by increasing or reducing the force which the plates on one side of the clutch apply to the plates on the other side of the clutch.

Additionally or alternatively, the slip between the two sides of the friction device 28, 30 of the on-coming gear 14a, 16a, 18a may be reduced to zero by varying the torque capacity of the friction device 28, 30 of the off-going gear 14a, 16a, 18a, step U9, for example this can be achieved by increasing or reducing the force which the plates on one side of the clutch apply to the plates on the other side of the clutch.

Following the speed phase the transmission system 8 then enters a lock-up phase during which the on-coming gear 14a, 16a, 18a is locked in rotation with the input shaft 10. The lock-up phase includes releasing the friction device 28, 30 of the off-going gear 14a, 16a, 18a, step U10, if it is being employed, that is to say if it has been used during the speed phase to synchronise the speed of the output shaft 12 with the speed of the input shaft 10. The transmission system 8 then engages the locking device 25, 26 of the on-coming gear 14a, 16a, 18a, step U11. Once the locking device 25, 26 of the on-coming gear 14a, 16a, 18a has been engaged the transmission system 8 then disengages the friction device 28, 30 of the on-coming gear 14a, 16a, 18a, step U12. The gear shift is then complete U13.

The second upshift method 500 also is initiated by a shift request U1; however the step U2 and the step U3 carried out during the preselection phase are omitted. The second method 500 does not transfer the torque from the locking device 25, 26 of the off-going gear 14a, 16a, 18a to the friction device 28, 30 of the off-going gear 14a, 16a, 18a before engaging the friction device 28, 30 of the on-coming gear 14a, 16a, 18a.

During the torque phase the transmission system 8 engages the friction device 28, 30 of the on-coming gear, step U4'. The system then disengages the locking device 25, 26 of the off-going gear 14a, 16a, 18a, step U5'.

The speed phase and the lock-up phase are substantially the same as that described above of the first upshift method 501.

Figure 13:
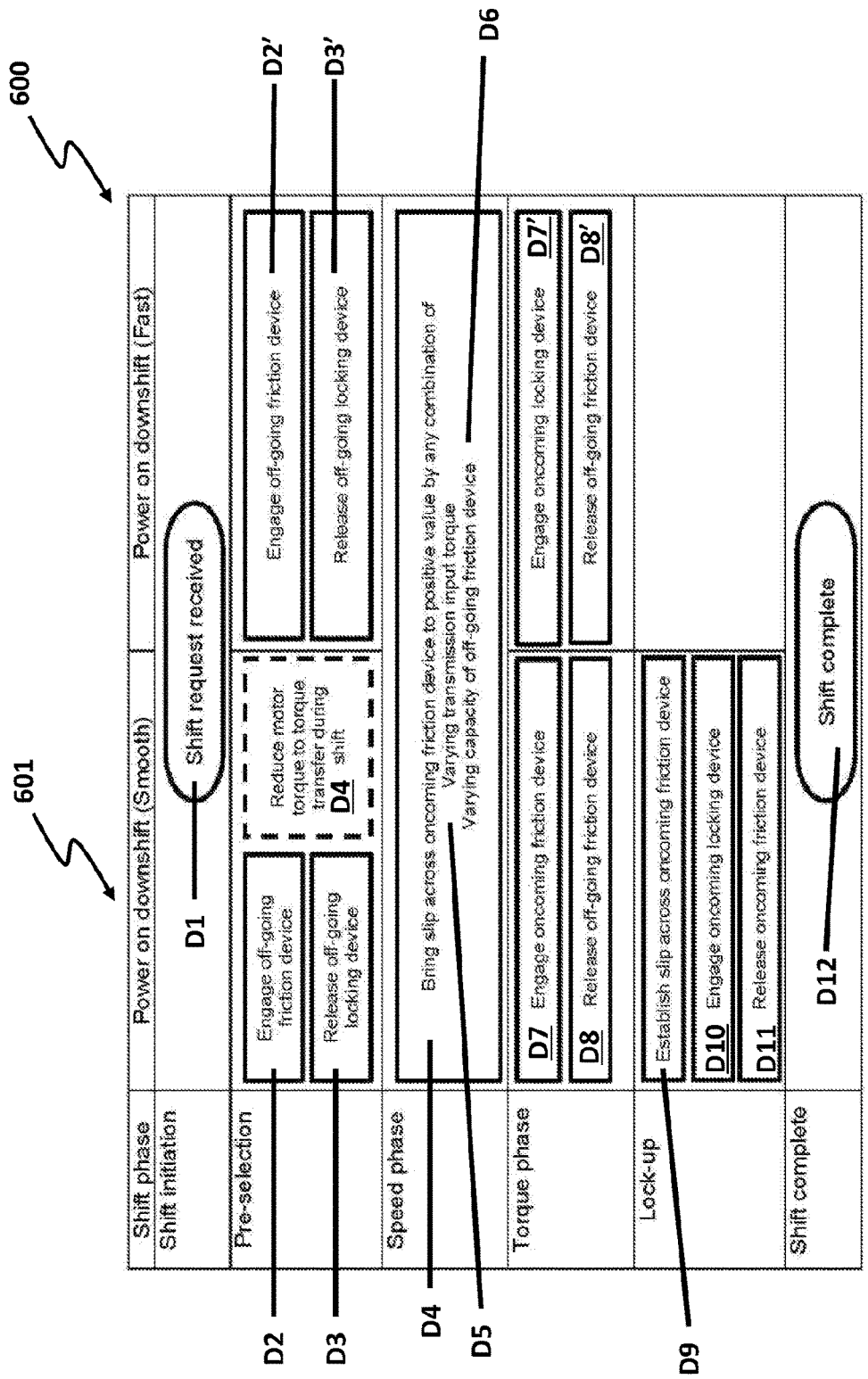
FIG. 13 is a table illustrating the steps of two alternative methods for downshifting gear ratios according to embodiments of the invention.

FIG. 13 illustrates two alternative methods for changing between two different gear ratios; the sequence of events is adapted for downshifting, that is to say changing between a first gear ratio and a second lower gear ratio. A first downshift method 601 is illustrated, the first downshift method 601 is adapted so as to provide a gear change having a smooth characteristic, this first downshift method 601 changes the gear ratio with a reduced or minimal disturbance in the torque delivery between the input shaft 10 and the output shaft 12, that is to say that the variations in the torque transferred between the input shaft 10 and the output shaft 12 during a change between gear ratios are minimised.

A second downshift method 600 is illustrated in FIG. 13; the second downshift method 600 is adapted so as to provide a gear change having a fast characteristic, this second downshift method 600 changes the gear ratio with maximum performance, second downshift method 600 minimises the delay or time taken to change between the first gear ratio and the second gear ratios. The second downshift method 600 reduces or minimises the changeover time period, the time period when the path through the transmission system 8 which the torque is transferred between the input shaft 10 and the output shaft 12 is being changed, that is to say the time period to switch from employing the first gear ratio for transferring torque between the input shaft 10 and output shaft 12 to employing the second gear ratio for transferring torque between the input shaft 10 and output shaft is minimised.

Again it is envisaged that the transmission system 8 will be configured to carry out both the first downshift method 601 and the second downshift method 600, and that the method employed may be dependent upon input criteria.

The first downshift method 601 is initiated by a shift request D1; the shift request D1 is received by the transmission system 8 from the control unit 1020.

For example the control unit 1020 may detect that the driver interacted with the user input device 1030, for example the user depresses the accelerator foot pedal to demand a rapid increase in speed of the vehicle 1000. The control unit 1020 determines that in order to deliver the requested performance a gear shift to a lower gear ratio is required and then the control unit 1020 sends a shift down request D1 to the transmission system 8.

The transmission system 8 then enters a preselection phase. In the preselection phase the transmission system 8 engages the friction device 28, 30 of the off-going gear 14a, 16a, 18a, as illustrated by step D2. The transmission system 8 then disengages the locking device 25, 26 of the off-going gear, step D3, such that the all torque delivered to the transmission system 8 by the engine is transferred from the input shaft 10 to the output shaft 12 by the friction device 28, 30 of the off-going gear 14a, 16a, 18a and there is substantially zero torque transferred from the input shaft 10 to the output shaft 12 by the locking device 25, 26 of the off-going gear 14a, 16a, 18a. Optionally, during the preselection phase the control unit 1020 reduces the torque delivered to the transmission system 8 by the engine or motor 1010, step D4.

When downshifting, the engine speed (the engine rpm) needs to increase in order to maintain the vehicles speed and effect a smooth gear change which reduces wear or on the power train of the vehicle.

Alternatively the speed of the vehicle needs to decrease to match the engine speed, this is undesirable as it may lead to a sudden deceleration, a "jolt" or "lurch" may be experienced by the driver which may lead to undesirable handling characteristics.

The transmission system 8 then enters a speed phase in which the rotation speed of the input shaft 10 is synchronised with the rotational speed of the output shaft 12. During this phase the transmission system 8 is configured such that there will be a positive degree of slip across the friction device 28, 30 of the on-coming gear 14a, 16a, 18a when engaged, step D5. Positive slip means that the input shaft 10 is rotating faster than the output shaft 12 this generates positive torque at the road wheels 1060. In this way the speed of the engine 1010 and input shaft 10 is rotating at a speed closer to, or equal to, that speed which is necessary to maintain the current vehicle speed or to increase the vehicles speed when engaged in the lower gear ratio being introduced.

The transmission system 8 achieves this by varying the input torque transmitted to the transmission system 8, step D6, that is to say reducing the torque produced by the engine 1010 and therefore reducing the torque on the input shaft 10 of the transmission system 8. In a vehicle employing a combustion engine this is achieved by reducing the rotational speed of the crankshaft of the engine 1010 (reducing the charge, fuel/air mixture, inserted into the engine cylinders); in a vehicle employing an electric motor the torque is reduced by reducing the rotational speed of the driveshaft, this may achieved by reducing the voltage across the motor or current. This may be achieved for example by repeatedly switching the voltage or current on and off with a transistor.

Additionally or alternatively, positive slip across the friction device 28, 30 of the oncoming gear 14a, 16a, 18a is achieved by regulating the torque capacity of the friction interface 26 of the off-going gear 14a, 16a, 18a to below that of the input torque from the engine or motor 1010 allowing the speed of the input shaft to increase until a positive slip condition is reached, step D7. For example, the torque capacity can be varied by increasing or reducing the force which the plates on one side of the clutch apply to the plates on the other side of the clutch.

Following the speed phase the transmission system 8 then enters a torque phase during which the torque transfer from the input shaft 10 to the output shaft 12 is changed from being transferred through the off-going gear 14a, 16a, 18a to the on-coming gear 14a, 16a, 18a. The friction device 28, 30 of the on-coming gear 14a, 16a, 18a is engaged, step D8, that is to say the plates of the clutch are pressed together in frictional engagement. The friction device 28, 30 of the off-going gear 14a, 16a, 18a is released, step D9.

The transmission system 8 then enters a lock-up phase during which the on-coming gear 14a, 16a, 18a is locked in rotation with the input shaft 10. The lock up phase may include the step of establishing slip across the friction device 28, 30 of the on-coming gear 14a, 16a, 18a, step D10. The transmission system 8 then engages the locking device 25, 26 of the on-coming gear 14a, 16a, 18a, step D11. Once the locking device 25, 26 of the on-coming gear 14a, 16a, 18a has been engaged the transmission system 8 then disengages the friction device 28, 30 of the on-coming gear 14a, 16a, 18a, step D12. The gear shift is then complete D13.

The second downshift method 600 also is initiated by a shift request D1. The preselection phase includes the step D2' in which the transmission system 8 engages the friction device 28, 30 of the off-going gear 14a, 16a, 18a. The transmission system 8 then disengages the locking device 25, 26 of the off-going gear, step D3' such that the all torque delivered to the transmission system 8 by the engine is transferred from the input shaft 10 to the output shaft 12 by the friction device 28, 30 of the off-going gear 14a, 16a, 18a and there is substantially zero torque transferred from the input shaft 10 to the output shaft 12 by the locking device 25, 26 of the off-going gear 14a, 16a, 18a. The optional step D4 of reducing the torque delivered to the transmission system 8 by the engine or motor 1010 is omitted, during the preselection phase of the fast downshift method 600.

The speed phase is substantially the same as that described above of the first downshift method 601.

A torque phase follows the speed phase, during the torque phase the delivery of torque from the input shaft 10 to the output shaft 12 is transferred from being via the off-going gear ration to the on-coming gear ratio. This involves engaging the locking device 25, 26 of the on-coming gear 14a, 16a, 18a, step D8'. The friction device 28, 30 of the off-going gear 14a, 16a, 18a is then disengaged, step D9'.

Since the on-coming gear 14a, 16a, 18a is in locking engagement, that it to say the transmission system 8 is employing the locking device 25, 26 to transfer torque from the input shaft 10 to the output shaft 12 there is no requirement in the second, fast, downshift method 600 to enter a lock-up phase. The lock-up phase and the torque phase may be considered to be carried out simultaneously. The shift is then complete D12.

The second downshift method 600 does not transfer the torque from the friction device 28, 30 of the off-going gear 14a, 16a, 18a to the friction device 28, 30 of the oncoming gear 14a, 16a, 18a before engaging the locking device 25, 26 of the on-coming gear 14a, 16a, 18a.

It is envisaged that the torque sensors $Ts_1$, $Ts_2$ will be coupled to the control unit 1020 such that the control unit 1020 can employ torque measurement data from the transmission system 8 to determine when to handover from a locking device 25, 26 a friction interface 28, that is to say release the locking device 25, 26, when to handover from a friction device 28, 30 to a locking device 25, 26 that is to say engage the locking device 25, 26, or when to handover from a friction device 28, 30 of an off-going floating gear 14a, 16a, 18a to a friction device 28, 30 of an on-coming floating gear 14a, 16a, 18a to engage the locking interfaces 26.

In the first and second upshift method 501, 500 illustrated in FIG. 12 and the first and second downshift methods 601, 600 illustrated in FIG. 13 it is envisaged that during the torque phase the methods may optionally employ the friction interfaces 28, 30 of one or more of the other floating gears 14a, 16a, 18a other than the off-going floating gear and the on-coming floating gear. In this way when transferring torque from one gear ratio to another the additional friction interfaces 28, 30 of the additional floating gears being employed increase the total torque capacity of the transmission system 8. Each additional friction device 28, 30 used contributes an additional torque handling capacity.

Figure 14:
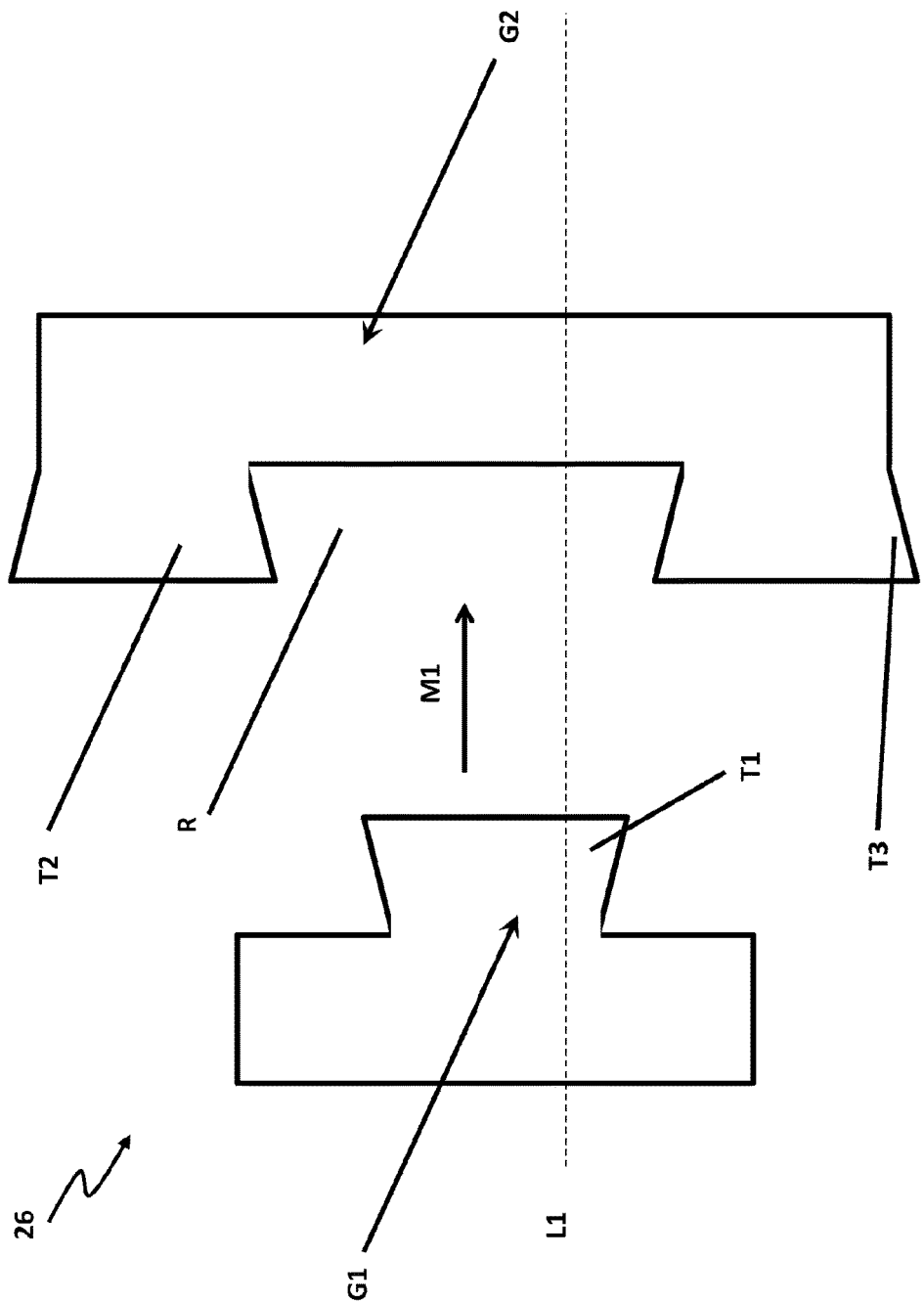
FIGS. 14 to 16 are schematic views illustrating a method of aligning teeth of a first gear wheel with grooves or recesses in a second gear wheel.
Figure 15:
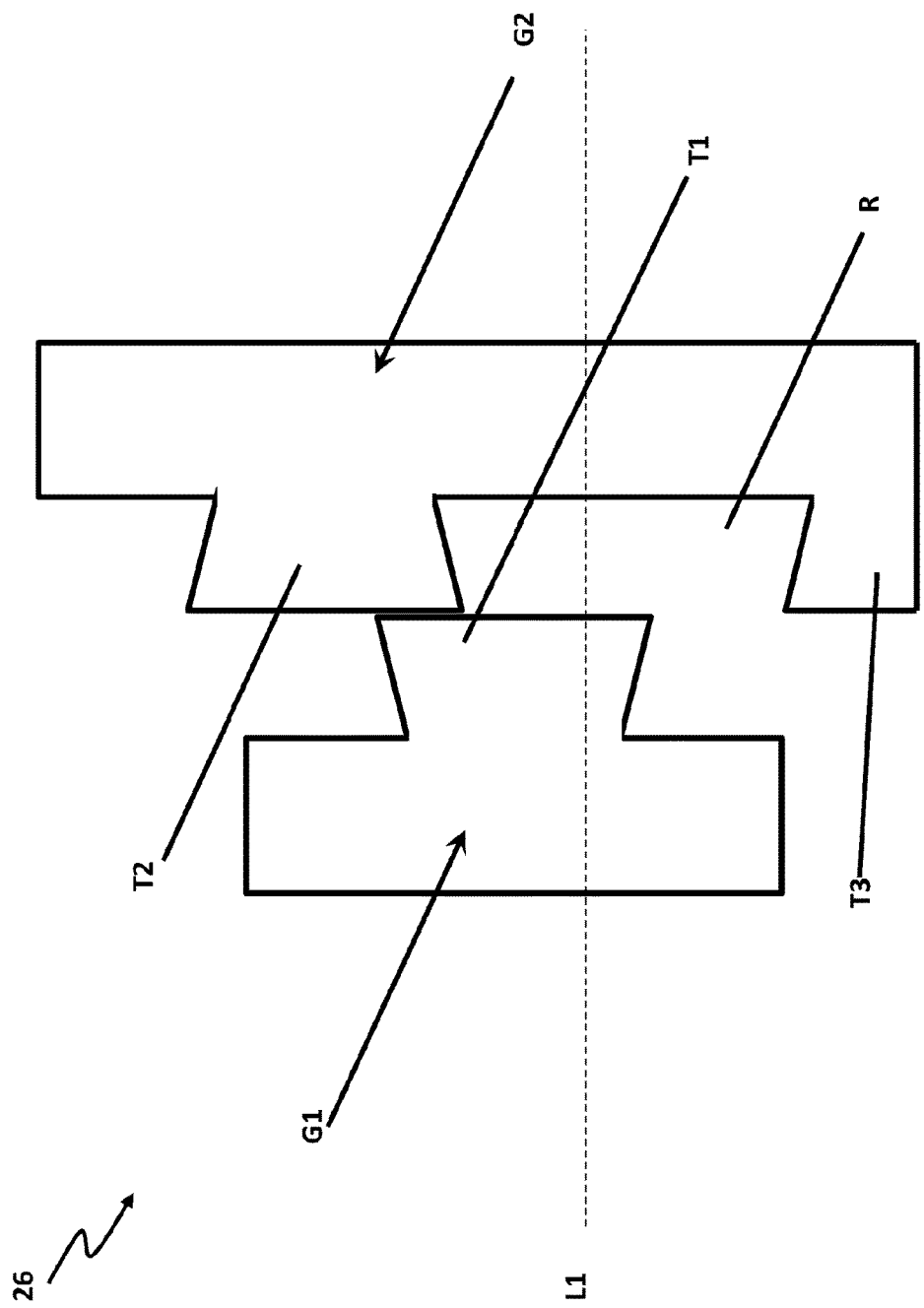
Figure 16:
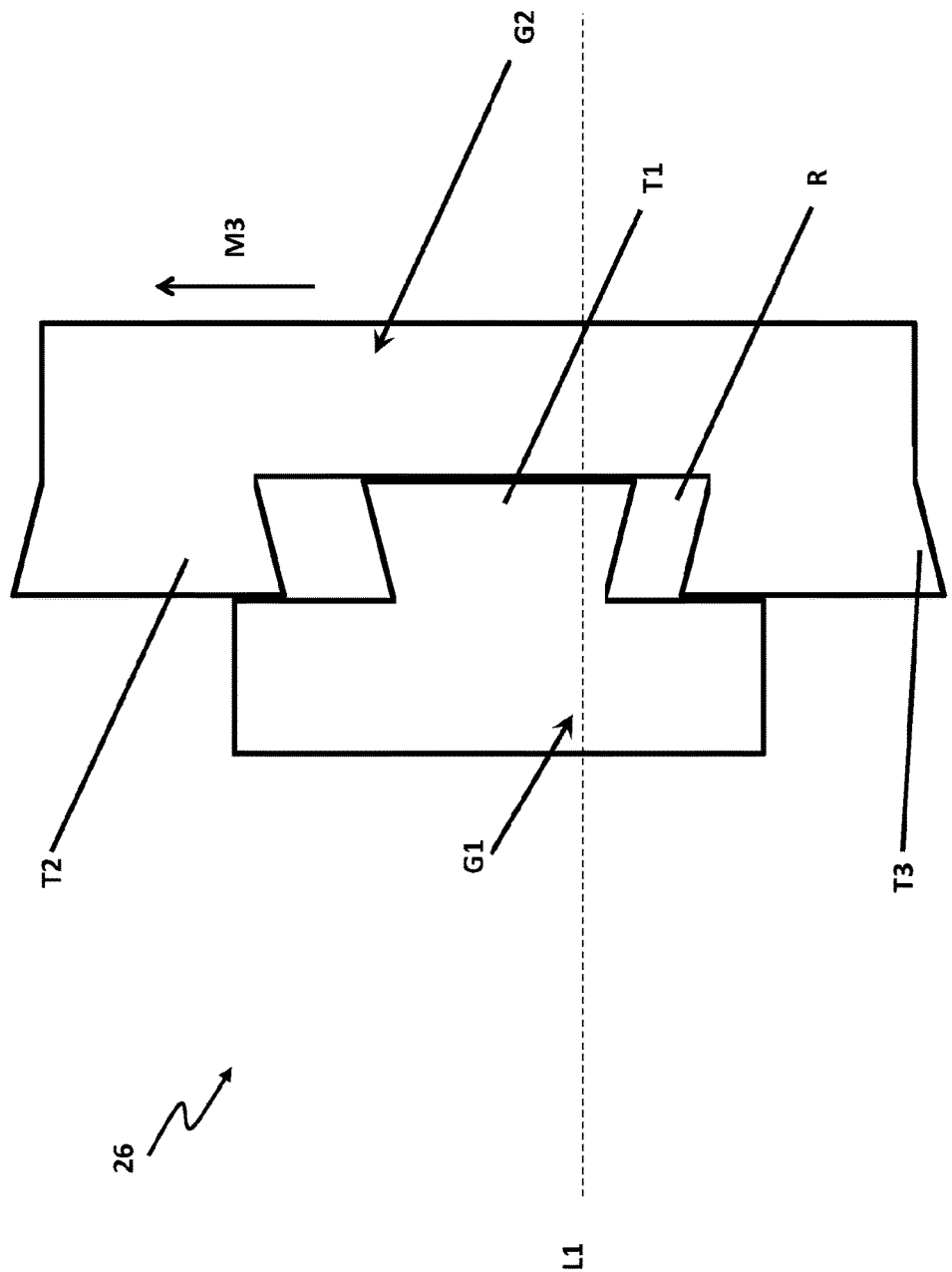

FIGS. 14 to 16 illustrate schematically a method of engaging a locking device 25, 26. The method facilitates handing over from a friction device 28, 30 to a locking device 25, 26. The locking device 25, 26 comprises a first side G1 and a second side G2. It is envisaged that the first and second side G1, G2 are each dog gears having dog teeth. The first side G1 of the locking interface may be mounted upon the input shaft 10 (not shown in FIGS. 14 to 16) in rotational engagement therewith. The second side G2 may be mounted upon the floating gear 14a, 16a, 18a or integrally formed therewith. When the first side G1 is in engagement with the second side G2, see FIG. 16, then the floating gear 14a, 16a, 18a will rotate with the input shaft 10.

The first and second sides G1, G2 start in a position spaced apart in an axial direction of the input shaft 10 denoted by notional line L1 shown as a phantom line.

The first and second sides G1, G2 are being synchronously rotated about the axis of the input shaft 10 together. An actuator 32a, 32b, 34, 35 moves the first side G1 towards the second side G2 as indicated by direction arrow M1 in order to insert the tooth T1 projecting from the first side G1 into the recess R defined in the second side G2. In some embodiments the recess R is defined by a gap between two adjacent teeth T2, T3 projecting from the second side G2. It is envisaged that each of the first and second sides G1, G2 will comprise a plurality of teeth and a plurality of recesses and that the each recess of one of the first and second sides G1, G2 receives a respective tooth from the other of the first and second sides G1, G2.

If the tooth T1 on the first side G1 is aligned with the recess R on the second side G2, as illustrated in FIG. 14 then the actuator 32a, 32b, 34, 35 can slide the tooth T1 into the recess R as shown in FIG. 15. A position sensor (not shown) determines that the tooth has been fully inserted into the recess R, that is to say the first side G1 has been moved a sufficient distance that the tooth T1 of the first side is fully engaged in the recess R of the second side G2. When the control unit 1020 has determined that the first side G1 is fully engaged with the second side G2 it will then instruct the transmission system 8 to release the friction device 28, 30 of the floating gear 14a, 16a, 18a being selected.

In circumstances where the tooth T1 is misaligned with the recess R, as illustrated in FIG. 16, the tooth T1 of the first side G1 collides with the tooth T2 of the second side G2 preventing the tooth T1 from being inserted into the recess R. The control unit 1020 determines from the data received from the position sensor that the first side G1 has not been moved in the axial direction sufficiently to be engaged in the recess R. The control unit 1020 therefore introduces some slip into the friction device 28, 30, for example this can be achieved by reducing the pressure between the plates of the clutch such that relative movement is introduced between the two sides thereof. The control unit 1020 then instructs the actuator 32a, 32b, 34, 35 to reattempt to insert the tooth T1 into the recess R. In some embodiments the control unit 1020 may increase the force across the friction interface to stop the friction device 28, 30 from slipping before reattempting to insert the tooth T1 into the recess R. In other embodiments the control unit 1020 may employ the friction device 28, 30 to precisely control the amount of relative movement between the first side G1 and the second side G2 for example by determining an angle through which the second side G2 must rotate relative to the first side G1 in order to align the tooth T1 with the recess R. Once the control unit 1020 receives data from the position sensor indicating that the first side G1 is fully engaged with the second side G2 it will instruct the friction device 28, 30 to disengage.

It can be appreciated that various changes may be made within the scope of the present invention, for example, in other embodiments of the invention it is envisaged that the double activator may be provided with one friction interface on each side, alternatively the double activator may be provided with one locking interface on each side, the single activators may not be commanded together but independently of each other. The floating gears may not be provided on the same shaft, some or all of the floating gears may be provided on the output shaft. A third shaft may be provided with floating gears which is also coupled to the output shaft.

The transmission system 8 may be provided with multiple output shafts each coupleable to the input shaft and to a further shaft or shafts which may be coupled to additional devices, such as in a vehicle application a differential and subsequently to the vehicles drive wheels.

The transmission system 8 may be provided with one or more additional clutches for coupling the input shaft to the engine or motor. These additional clutches may be employed only when launching the vehicle from a stationary position and/or during gear shifting events.

In some embodiments the transmission system 8 may engage the friction interfaces between two or more gear ratios when launching the vehicle from a stationary position.

In alternative embodiments the cylinder/piston arrangement may be replaced with an alternative machine such as but not limited to a magnetic or electromagnetic device, a worm gear and electric motor, a pneumatic system or a manual system.

The invention claimed is:

1. A method for shifting gear ratios of a transmission system comprising:
providing a first floating gear rotationally mounted upon a first shaft and a floating gear activation system for controlling torque transfer between the first floating gear and the first shaft, the gear activation system comprising a first device having a friction interface for frictional engagement with a friction interface disposed on a first side of the first floating gear, and a second device having a locking interface for interpositional engagement with a locking interface disposed on a second side of the first floating gear, the second side opposing the first side;

providing a second floating gear rotationally mounted upon the first shaft and the gear activation system comprising a third device having a friction interface for frictional engagement with a friction interface disposed on a first side of the second floating gear, and a fourth device having a locking interface for interpositional engagement with a locking interface disposed on a second side of the second floating gear, the second side opposing the first side;

engaging the friction interface of the first device with the friction interface of the first floating gear by sliding the first device along the first shaft;

disengaging the locking interface of the second device from the locking interface of the first floating gear by sliding the second device along the first shaft;

engaging the friction interface of the third device with the friction interface of the second floating gear by sliding the third device along the first shaft;

disengaging the friction interface of the first device with the friction interface of the first floating gear by sliding the first device along the first shaft;

engaging the locking interface of the fourth device with the locking interface of the second floating gear by sliding the fourth device along the first shaft;

disengaging the friction interface of the third device with the friction interface of the second floating gear by sliding the third device along the first shaft; and shifting a transmission of torque from the first floating gear to the second floating gear without interrupting a delivery of torque through the transmission system.

2. The method according to claim 1 comprising:
receiving data from a sensor indicating the torque being transferred by the friction interfaces of the first floating gear is substantially zero.

3. The method according to claim 1 comprising:
receiving data from a sensor indicating the torque being transferred by the friction interfaces of the second floating gear is substantially equal to the torque delivered to the transmission system by an engine or motor.

4. The method for shifting gear ratios according to claim 1 wherein torque is transferred from the first floating gear to the second floating gear while the friction interface of the first device is engaged with the friction interface of the first floating gear and the friction interface of the third device is simultaneously engaged with the friction interface of the second floating gear, whereby effecting a powershift between the first floating gear and the second floating gear.

5. The method for shifting gear ratios according to claim 1 comprising providing at least one further floating gear mounted upon the first shaft, each at least one further floating gear having a friction interface for frictional engagement with a respective friction interface of at least one further device, the method further comprising;
frictionally engaging one or more of the friction interfaces of the at least one further floating gears,
and simultaneously,
engaging the friction interface of the third device with the friction interface of the second floating gear by sliding the third device along the first shaft.

6. A method for shifting gear ratios of a transmission system comprising:

providing a first floating gear rotationally mounted upon a first shaft and a floating gear activation system for controlling torque transfer between the first floating gear and the first shaft, the gear activation system comprising a first device having a friction interface for frictional engagement with a friction interface disposed on a first side of the first floating gear, and a second device having a locking interface for interpositional engagement with a locking interface disposed on a second side of the first floating gear, the second side opposing the first side;

providing a second floating gear rotationally mounted upon the first shaft and the gear activation system comprising a third device having a friction interface for frictional engagement with a friction interface disposed on a first side of the second floating gear, and a fourth device having a locking interface for interpositional engagement with a locking interface disposed on a second side of the second floating gear, the second side opposing the first side;

engaging the friction interface of the third device with the friction interface of the second floating gear by sliding the third device along the first shaft;

disengaging the locking interface of the second device from the locking interface of the first floating gear by sliding the second device along the first shaft;

engaging the locking interface of the fourth device with the locking interface of the second floating gear by sliding the fourth device along the first shaft;

disengaging the friction interface of the third device with the friction interface of the second floating gear by sliding the third device along the first shaft; and shifting a transmission of torque from the first floating gear to the second floating gear without interrupting a delivery of torque through the transmission system.

7. The method according to claim 6 comprising:
receiving data from a sensor indicating the torque being transferred by the friction interfaces of the first floating gear is substantially zero.

8. The method according to claim 6 comprising:
receiving data from a sensor indicating the torque being transferred by the friction interfaces of the second floating gear is substantially equal to the torque delivered to the transmission system by an engine or motor.

9. The method for shifting gear ratios according to claim 6 wherein torque is transferred from the first floating gear to the second floating gear while the friction interface of the first device is engaged with the friction interface of the first floating gear and the friction interface of the third device is simultaneously engaged with the friction interface of the second floating gear, whereby effecting a powershift between the first floating gear and the second floating gear.

10. The method for shifting gear ratios according to claim 6 comprising providing at least one further floating gear mounted upon the first shaft, the or each at least one further floating gear having a friction interface for frictional engagement with a respective friction interface of at least one further device, the method further comprising;
frictionally engaging one or more of the friction interfaces of the at least one further floating gears,
and simultaneously,
engaging the friction interface of the third device with the friction interface of the second floating gear by sliding the third device along the first shaft.

11. A transmission system comprising at least two floating gears rotationally mounted upon a first shaft, and at least two further gears mounted upon at least one further shaft, at least one further gear being coupled to a respective one of the at least two floating gears on the first shaft, the transmission system comprising a floating gear activation system for controlling torque transfer between each of the at least two floating gears and the first shaft, the gear activation system comprising a first device having a friction interface for frictional engagement with a friction interface disposed on a first side of each of the at least two floating gears, and a second device having a locking interface for an interpositional engagement with a locking interface disposed on a second side, opposing the first side, of each of the at least two floating gears, whereby the floating gear is rotationally coupleable to the first shaft by the friction interface and/or the locking interface, the transmission system comprising a control unit coupled to a sensor for measuring a parameter indicative of the torque on the first shaft the sensor positioned between a first floating gear of the at least two floating gears and a second floating gear of the at least two floating gears, wherein the control unit receives data from the sensor indicating which of the first or second floating gears is transferring torque from the first shaft to the at least one further shaft.

12. The transmission system of claim 11 wherein the first and second devices are slidingly mounted upon the first shaft in rotational engagement with the first shaft.

13. The transmission system of claim 11 wherein the at least two further gears are fixedly mounted on the at least one further shaft for rotational movement therewith.

14. The transmission system of any of claim 11 wherein the at least two further gears are floating gears rotationally mounted upon the at least one further shaft.

15. The transmission system according to claim 11 wherein the friction interfaces comprise a clutching mechanism.

16. The transmission system according to claim 15 wherein the clutch mechanism is a cone clutch.

17. The transmission system according to claim 11 wherein the locking interfaces comprise a dog clutch.

18. A method for engaging a locking interface of a transmission system comprising:
providing a transmission system comprising first shaft having a first floating gear mounted thereon, and a first activator for synchronising rotation of the first floating gear with the first shaft, the first floating gear having a first locking interface for interpositional engagement with a second locking interface provided upon the first activator, the first and second locking interfaces forming a locking device, the first activator being slidingly mounted upon the first shaft for movement in an axial direction, a second activator for synchronising rotation of the first floating gear with the first shaft, the first floating gear having a first friction interface for frictional engagement with a second friction interface provided upon the second activator, the first and second friction interfaces forming a friction device, and the transmission system comprising at least one sensor for providing data indicative of the axial position of the first activator;
engaging the friction device to synchronise rotation of the first floating gear with the first shaft;
sliding the first activator along the first shaft until the first locking interface contacts the second locking interface;
receiving data from the sensor;
determining whether the first activator has moved to a position in which the first locking interface is in interpositional engagement with the second locking interface;
if the first locking interface is in interpositional engagement with the second locking interface;
disengaging the frictional device; or
if the first locking interface is not in interpositional engagement with the second locking interface;
reducing the frictional engagement between the first and second friction interfaces; whereby
rotating the first floating gear with respect to the first shaft such that the first locking interface rotates with respect to the second locking interface;
resliding the first activator along the first shaft until the first locking interface is in interpositional engagement with the second locking interface.

19. The method according to claim 18 wherein the step of reducing the frictional engagement between the first and second friction interfaces is followed by the step of:
increasing the frictional engagement between the first and second friction interfaces so as to synchronise the rotation of the first floating gear with the first shaft after the first floating gear has rotated with respect to the first shaft by predetermined angle.

20. The method according to claim 18 wherein the step of resliding the first activator along the first shaft until the first locking interface is in interpositional engagement with the second locking interface is carried out after the first floating gear has rotated with respect to the first shaft by predetermined angle.

21. The method according to claim 18 wherein the step of resliding the first activator along the first shaft until the first locking interface is in interpositional engagement with the second locking interface is carried out whilst the first floating gear is rotating with respect to the first shaft.

22. A transmission system comprising at least two floating gears rotationally mounted upon a first shaft, the system comprising a floating gear activation system for controlling torque transfer between the at least two floating gears and the first shaft, the gear activation system comprising a first device having a friction interface for frictional engagement with a friction interface disposed on a first side of at least one floating gear, and a second device having a locking interface for an interpositional engagement with a locking interface disposed on a second side, opposing the first side, of the at least one floating gear, whereby each of the at least two floating gears is rotationally coupleable to the first shaft by the friction interface and/or the locking interface, and a transfer of torque is shifted from one floating gear to a different floating gear without interrupting a delivery of torque through the transmission system.

23. The transmission system of claim 22 comprising at least one further gear mounted upon at least one further shaft said at least one further gear being coupled to a respective one of the at least one floating gear on the first shaft.

24. The transmission system of claim 23 wherein the at least one further gear is fixedly mounted on the at least one further shaft for rotational movement therewith.

25. The transmission system of claim 23 wherein the at least one further gear is a floating gear rotationally mounted upon the at least one further shaft.

26. The transmission system according to claim 22 wherein the friction interfaces comprise a clutching mechanism.

27. The transmission system according to claim 26 wherein the clutch mechanism is a cone clutch.

28. The transmission system according to claim 22 wherein the locking interfaces comprise a dog clutch.

29. The transmission system according to claim 22 wherein the first device comprises a first and a second side, and the friction interface of the first device is provided on the first side of the first device and a locking interface of the first device is provided on the second side of the first device for engagement with the different floating gear provided on the first shaft.

30. The transmission system according to claim 22 wherein the first device comprises a first and second side, and the friction interface of the first device is provided on the first side of the first device and a second friction interface of the first device is provided on the second side of the first device for engaging with the different floating gear provided on the first shaft.

31. The transmission system according to claim 22 wherein the second device comprises a first and second side, and the locking interface of the second device is provided on the first side of the second device and a friction interface of the second device is provided on the second side of the second device for engaging with the different floating gear provided on the first shaft.

32. The transmission system according to claim 22 wherein the second device comprises a first and second side and the locking interface of the second device is provided on the first side of the second device and a second locking interface of the second device is provided on the second side of the second device for engaging with the different floating gear provided on the first shaft.

33. A device for a transmission system comprising:
a first side;
a second side, opposing the first side;
a friction interface for frictional engagement with a friction interface of a first gear; a locking interface for an interpositional engagement with a locking interface of a second gear;
wherein the friction interface is disposed on the first side and the locking interface is disposed on the second side, and
wherein a transfer of torque is shifted from the first gear to the second gear without interrupting a delivery of torque through the transmission system.

34. A transmission system comprising the device of claim 33.

35. A vehicle comprising the transmission system of claim 11.

36. A method for activating a floating gear of a transmission system comprising:
providing a first floating gear rotationally mounted upon a first shaft and a floating gear activation system for controlling torque transfer between the first floating gear and the first shaft, the gear activation system comprising a first device having a friction interface for frictional engagement with a friction interface disposed on a first side of the first floating gear, and a second device having a locking interface for an interpositional engagement with a locking interface disposed on a second side of the first floating gear, the second side opposing the first side;
sliding the first device along the first shaft, in a first direction, into frictional engagement with the friction interface on the first side of the first gear, transferring torque to the first floating gear from the first shaft so as to substantially synchronise the first floating gear with the first shaft, and then sliding the second device along the first shaft, in a second direction opposing said first direction, into locking engagement with the locking interface on the second, opposing, side of the first gear, whereby locking the first floating gear with the first shaft, while simultaneously sliding a third device of the gear activation system along the first shaft to disengage the third device from a second floating gear rotationally mounted upon the first shaft; and
shifting a transmission of torque from the second floating gear to the first floating gear without interrupting a delivery of torque through the transmission system.

37. The method for activating a floating gear of a transmission system according to claim 36 comprising sliding the first device along the first shaft, in the second direction, so as to disengage the friction interface of the first device from the friction interface on the first side of the first gear.

38. A method for shifting gear ratios of a transmission system comprising:
providing a first floating gear rotationally mounted upon a first shaft and a floating gear activation system for controlling torque transfer between the first floating gear and the first shaft, the gear activation system comprising a first device having a friction interface for frictional engagement with a friction interface disposed on a first side of the first floating gear, and a second device having a locking interface for interpositional engagement with a locking interface disposed on a second side of the first floating gear, the second side opposing the first side;
providing a second floating gear rotationally mounted upon the first shaft and the gear activation system comprising a third device having a friction interface for frictional engagement with a friction interface disposed on a first side of the second floating gear, and a fourth device having a locking interface for interpositional engagement with a locking interface disposed on a second side of the second floating gear, the second side opposing the first side;
engaging the friction interface of the first device with the friction interface of the first floating gear by sliding the first device along the first shaft;
disengaging the locking interface of the second device from the locking interface of the first floating gear by sliding the second device along the first shaft;
engaging the friction interface of the third device with the friction interface of the second floating gear by sliding the third device along the first shaft;
disengaging the friction interface of the first device with the friction interface of the first floating gear by sliding the first device along the first shaft;
engaging the locking interface of the fourth device with the locking interface of the second floating gear by sliding the fourth device along the first shaft; and
shifting a transmission of torque from the first floating gear to the second floating gear without interrupting a delivery of torque through the transmission system.

39. The method for shifting gear ratios according to claim 38 wherein torque is transferred from the first floating gear to the second floating gear while the friction interface of the first device is engaged with the friction interface of the first floating gear and the friction interface of the third device is simultaneously engaged with the friction interface of the second floating gear, whereby effecting a powershift between the first floating gear and the second floating gear.

40. The method for shifting gear ratios according to claim 38 comprising providing at least one further floating gear mounted upon the first shaft, each at least one further floating gear having a friction interface for frictional engagement with a respective friction interface of at least one further device, the method further comprising;

frictionally engaging one or more of the friction interfaces of the at least one further floating gears, and simultaneously, engaging the friction interface of the third device with the friction interface of the second floating gear by sliding the third device along the first shaft.

41. A method for holding a vehicle on a hill comprising:

providing a first floating gear rotationally mounted upon a first shaft and a floating gear activation system for controlling torque transfer between the first floating gear and the first shaft, the gear activation system comprising a first device having a friction interface for frictional engagement with a friction interface disposed on a first side of the first floating gear, and a second device having a locking interface for interpositional engagement with a locking interface disposed on a second side of the first floating gear, the second side opposing the first side;

providing at least one further floating gear mounted upon the first shaft, each at least one further floating gear having a friction interface for frictional engagement with a respective friction interface of at least one further device;

wherein the method comprises;

frictionally engaging the friction interface of the first floating gear with the first device and/or engaging the locking interface of the first floating with the second device; and simultaneously, engaging one or more of the friction interfaces of the at least one further floating gear with the respective friction interface of the at least one further device; and shifting a transmission of torque from the first floating gear to the second floating gear without interrupting a delivery of torque through the transmission system.

42. A method for shifting gear ratios of a transmission system comprising:

providing a first floating gear rotationally mounted upon a first shaft and a floating gear activation system for controlling torque transfer between the first floating gear and the first shaft, the gear activation system comprising a first device having a friction interface for frictional engagement with a friction interface disposed on a first side of the first floating gear, and a second device having a locking interface for interpositional engagement with a locking interface disposed on a second side of the first floating gear, the second side opposing the first side;

providing a second floating gear rotationally mounted upon a second shaft, the second floating gear being coupled to the first shaft by a further gear mounted on the first shaft and the gear activation system comprising a third device having a friction interface for frictional engagement with a friction interface disposed on a first side of the second floating gear, and a fourth device having a locking interface for interpositional engagement with a locking interface disposed on a second side of the second floating gear, the second side opposing the first side;

engaging the friction interface of the first device with the friction interface of the first floating gear by sliding the first device along the first shaft;

disengaging the locking interface of the second device from the locking interface of the first floating gear by sliding the second device along the first shaft;

engaging the friction interface of the third device with the friction interface of the second floating gear by sliding the third device along the second shaft;

disengaging the friction interface of the first device with the friction interface of the first floating gear by sliding the first device along the first shaft;

engaging the locking interface of the fourth device with the locking interface of the second floating gear by sliding the fourth device along the second shaft.

43. A method for adapting the torque transfer function of a transmission system comprising:

engaging a friction interface of a first activator with a friction interface of a gear under test, disengaging a locking interface of a second activator from a locking interface of the gear under test;

reducing the force applied by the friction interface of the first activator to the friction interface of the gear under test, whereby introducing a predefined degree of slip;

recording a control parameter of the transmission system which produces the predefined degree of slip;

receiving a parameter indicative of torque value delivered to the transmission system;

interrogating a database to obtain a stored value of the control parameter corresponding to the value of the parameter indicative of torque value delivered to the transmission system;

comparing the stored value of the control parameter with the recorded value of the control parameter;

updating the data base with the recorded value of the control parameter if different to the stored values;

increasing the pressure between the friction interface of the first activator and the friction interface of the gear under test so as to synchronise the gear under test with the shaft upon which it is mounted;

engaging the locking interface of the gear under test by activating the second activator to interpose the locking interface of the second activator with the locking interface of the gear under test;

disengaging the friction interface of the first activator from the friction interface of the gear under test.

44. The method of claim 43 comprising:

detecting operation of the transmission system under stable conditions for the gear under test.

45. The method of claim 43 comprising:

waiting until steady state conditions are reached with micro slip between the friction interfaces.

46. The method of claim 43 wherein the method replaces the step of, interrogating the database to obtain a stored value of the control parameter corresponding to the value of the parameter indicative of torque value delivered to the transmission system;

with the step of, calculating a value of the control parameter corresponding to the value of the parameter indicative of torque value delivered to the transmission system.

47. The method of claim 43 wherein the method omits the step of, comparing the stored value of the control parameter with the recorded value of the control parameter;

and the method, updates the database with the recorded value of the control parameter irrespective of whether or not the value is different to the stored value.

48. The method of claim 43 wherein the method reduces the force applied by the friction interface of the first activator to the friction interface of the gear under test, to introduce a predefined degree of micro-slip.

49. A mechanism for moving an activator in a transmission system, which mechanism comprises a double acting cylinder having a double ended piston, the cylinder having a first port for fluid action on a first end of the piston and a second port for fluid action on a second end of the piston, the first port coupled to a first pressure control valve such that the mechanism can control the pressure or force applied when moving the piston in a first direction for engaging a friction interface of the transmission system, and the second port coupled to a direction control valve, such that the mechanism can control the direction of travel of the piston within the cylinder; and wherein:
  at least two mechanisms are configured to move at least two activators between frictional engagement with a floating gear and another floating gear and interpositional engagement with one of the floating gear and the another floating gear to shift a transfer of torque between the floating gear and the another floating gear within interrupting a delivery of torque through the transmission system.

50. A transmission system comprising a floating gear mounted upon a first shaft, the floating gear having a first side comprising a friction interface and a second side comprising a locking interface, wherein a first activator is disposed adjacent the first side of the floating gear and comprises a friction interface for frictional engagement with the floating gear, a second activator being disposed on the second side of the floating gear and having a locking interface for interposition with the locking interface of the floating gear and another friction interface for frictional engagement with another floating gear mounted upon the first shaft; and wherein:
  the floating gear can be rotationally coupled to the first shaft by the first activator and/or the second activator,
  the another floating gear can be rotationally coupled to the first shaft by the second activator, and
  a transfer of torque is shifted from the floating gear to the another floating gear without interrupting a delivery of torque through the transmission system.

51. A transmission system comprising a device slideably mounted upon a shaft, the device comprising first side comprising a friction interface for frictional engagement with a friction interface of a floating gear provided on the shaft and a second side comprising a locking interface for interpositional engagement with a locking interface of another floating gear provided on the shaft, wherein the device comprises a body mounted upon a support in rolling or sliding contact therewith for movement along the shaft, the device having a resilient device whose biasing force must be overcome when moving the body in a direction for engagement of the friction interface with the friction interface of the floating gear, and a transfer of torque is shifted from the floating gear to the another floating gear without interrupting a delivery of torque through the transmission system.

52. The transmission system according to claim 51 wherein the body comprises a ramp or recess which forms a detent for resisting movement of the body with respect to the support.

* * * * *